July 11, 1950  E. A. LANDBERG ET AL  2,514,701
AUTOMATIC PHONOGRAPH
Filed July 5, 1944  15 Sheets-Sheet 3
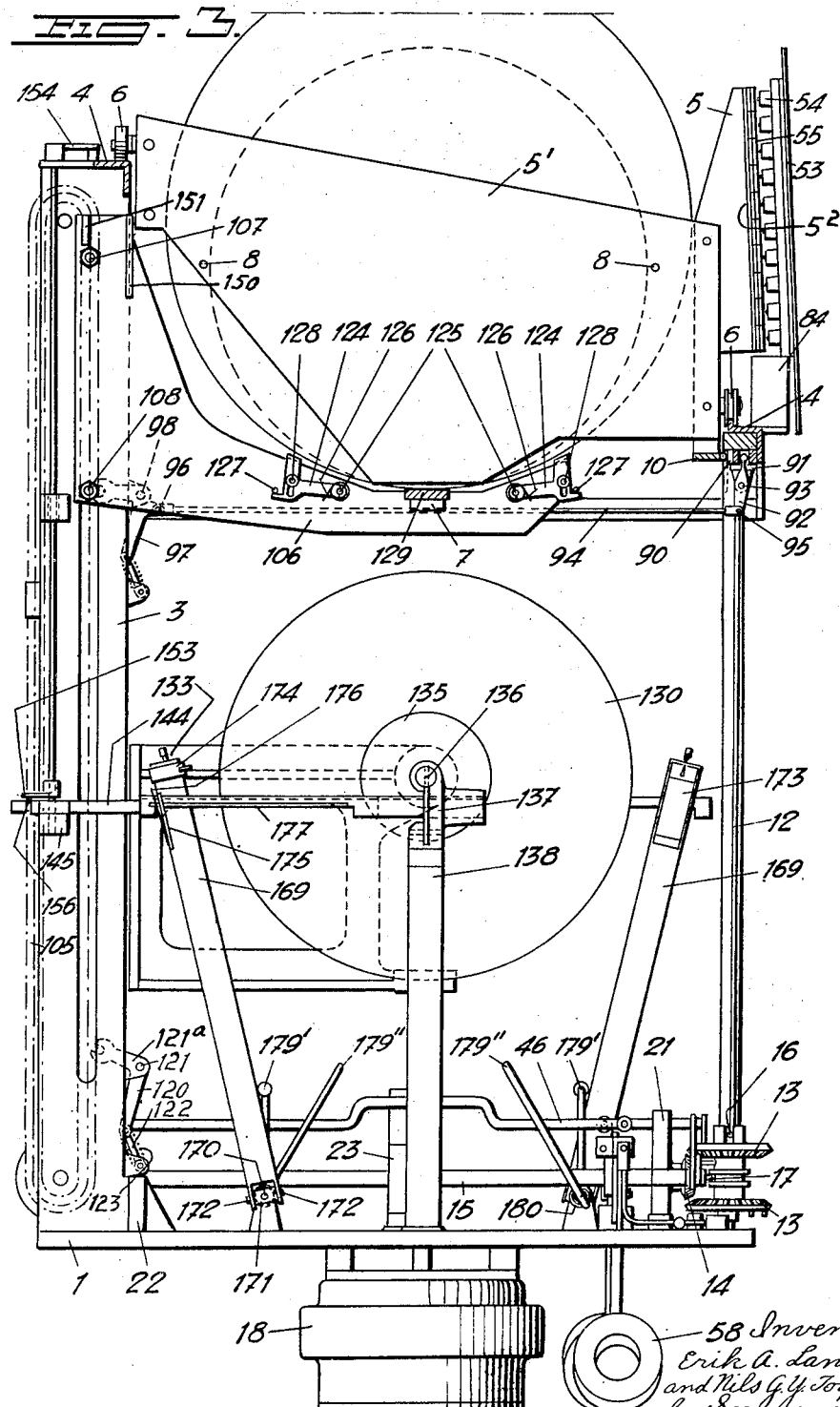
Inventors
Erik A. Landberg,
and Nils G. Y. Torphammar,
by Sommers & Young
Attorneys

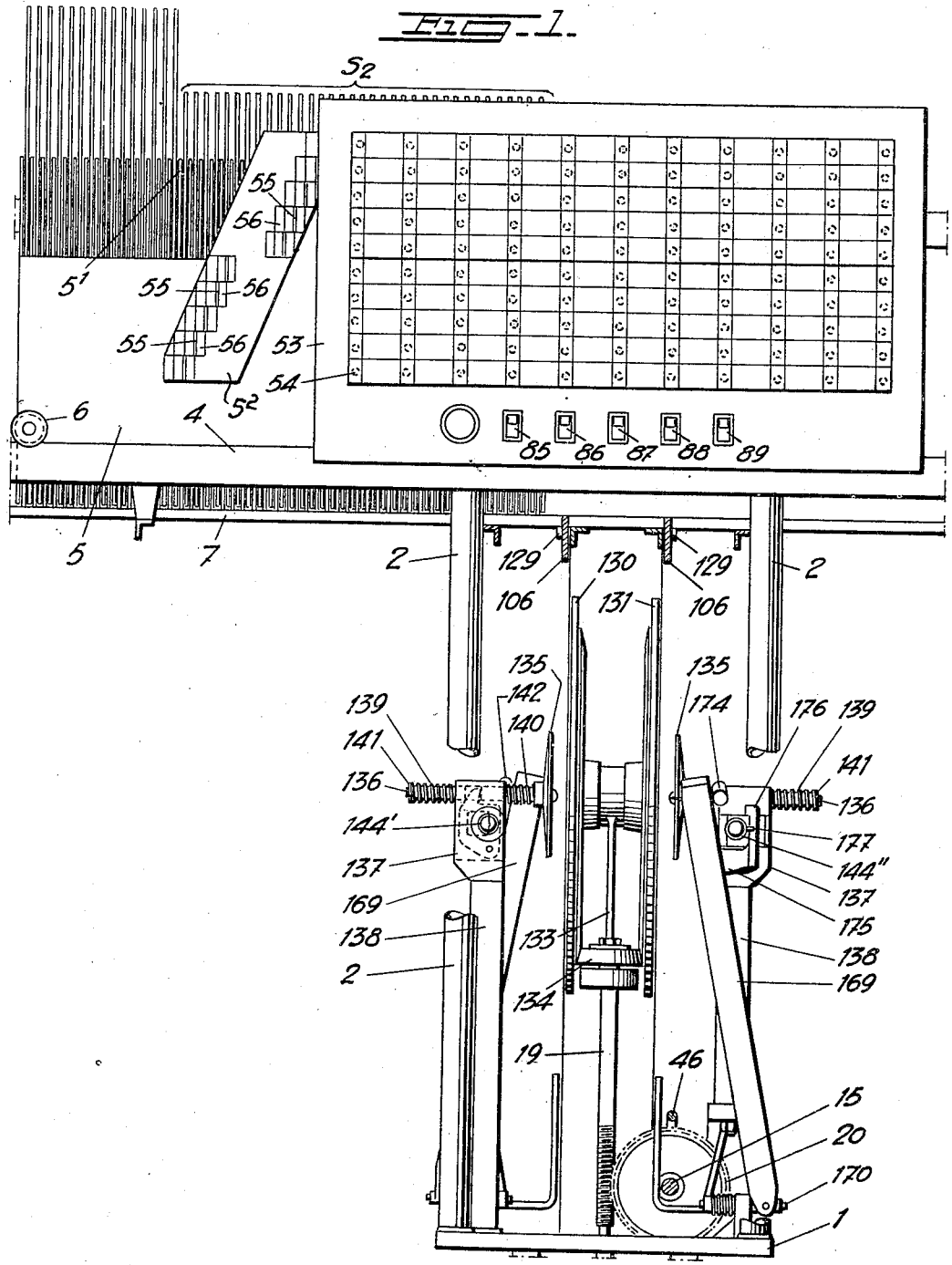

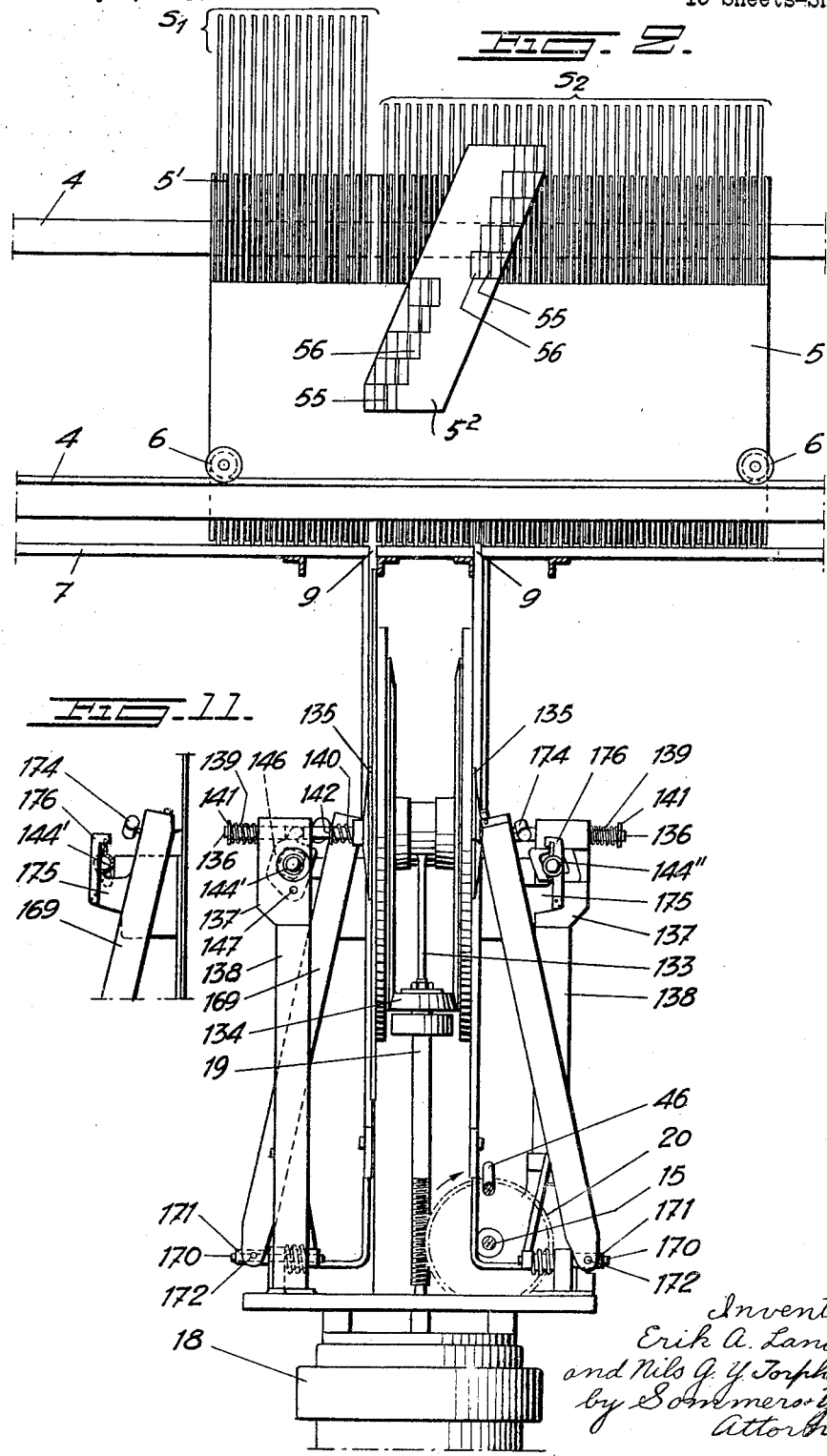

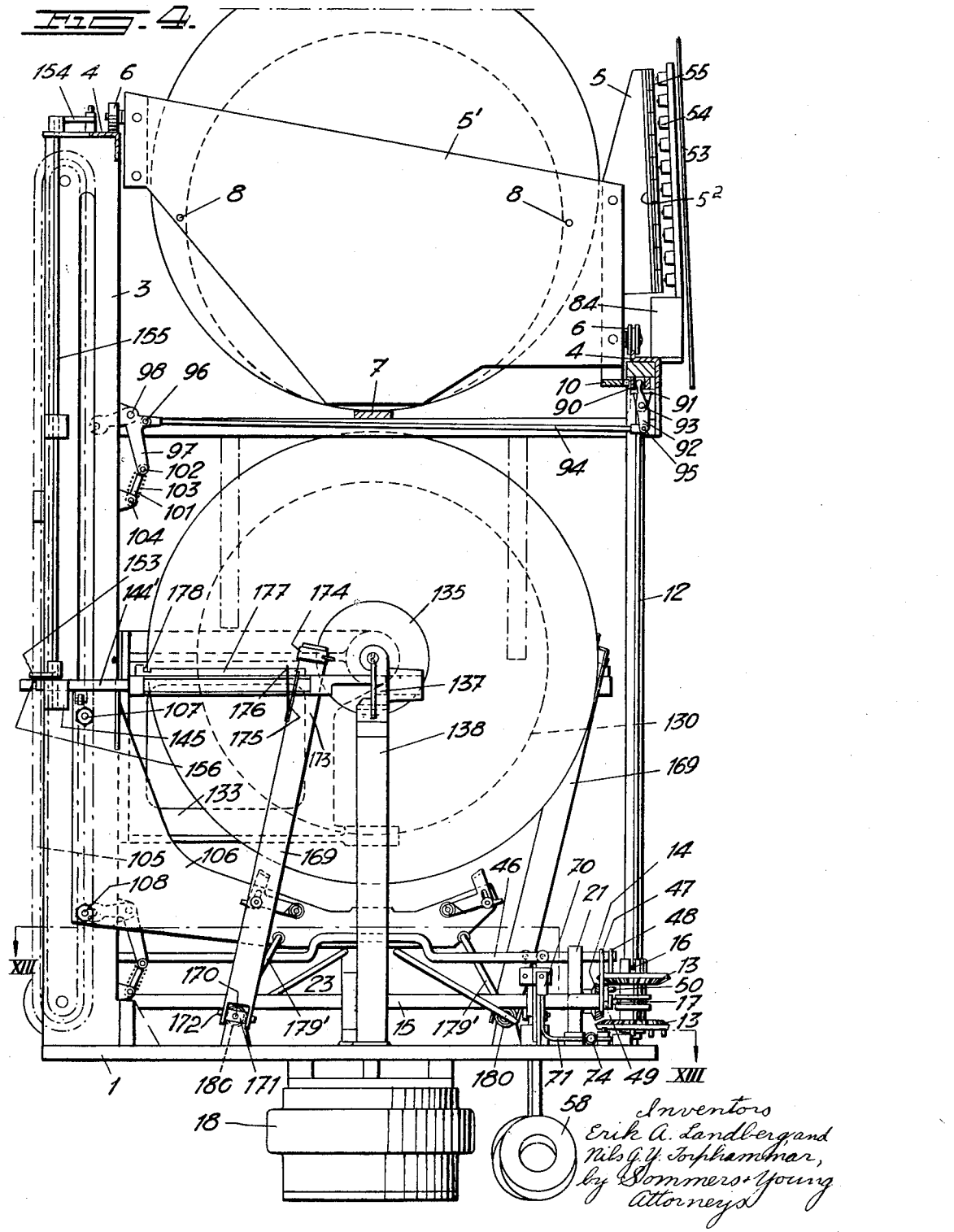

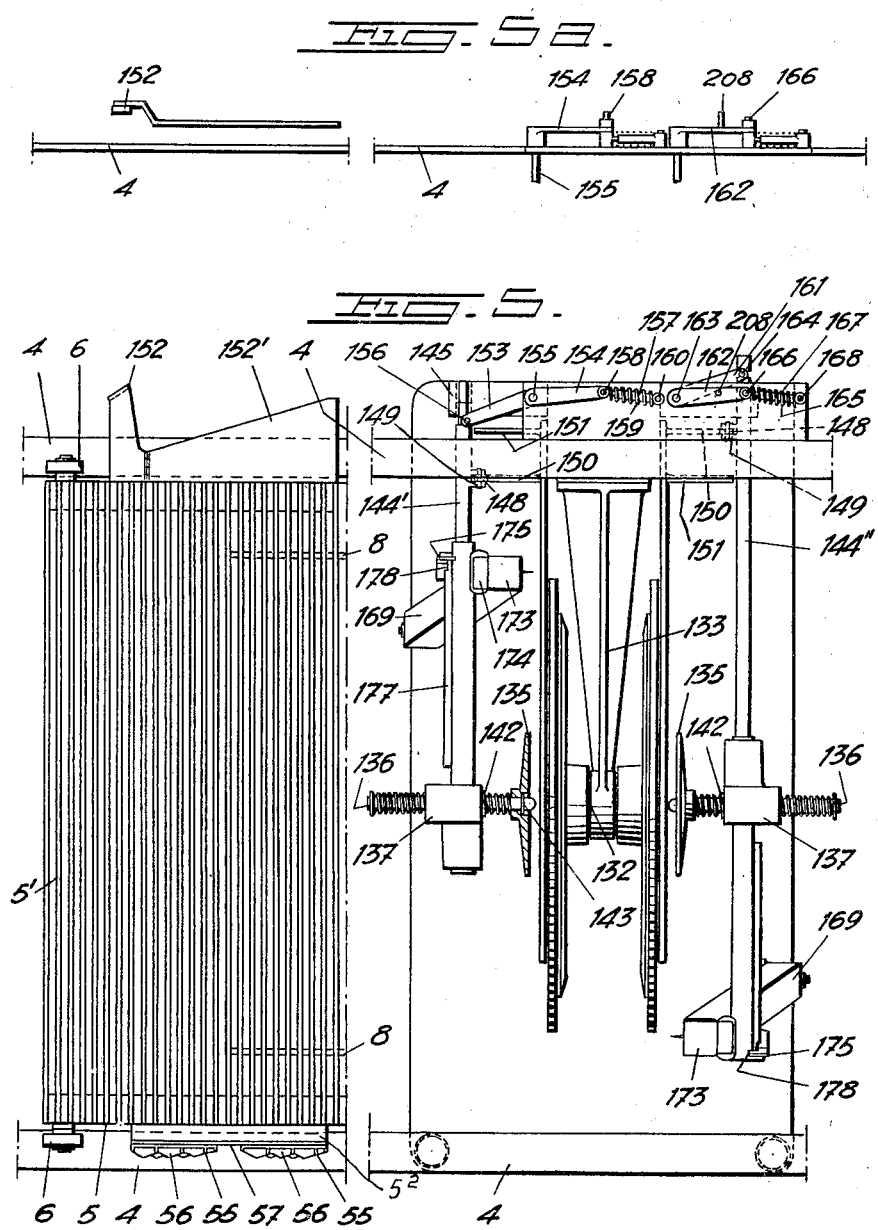

July 11, 1950 E. A. LANDBERG ET AL 2,514,701
AUTOMATIC PHONOGRAPH
Filed July 5, 1944 15 Sheets-Sheet 6
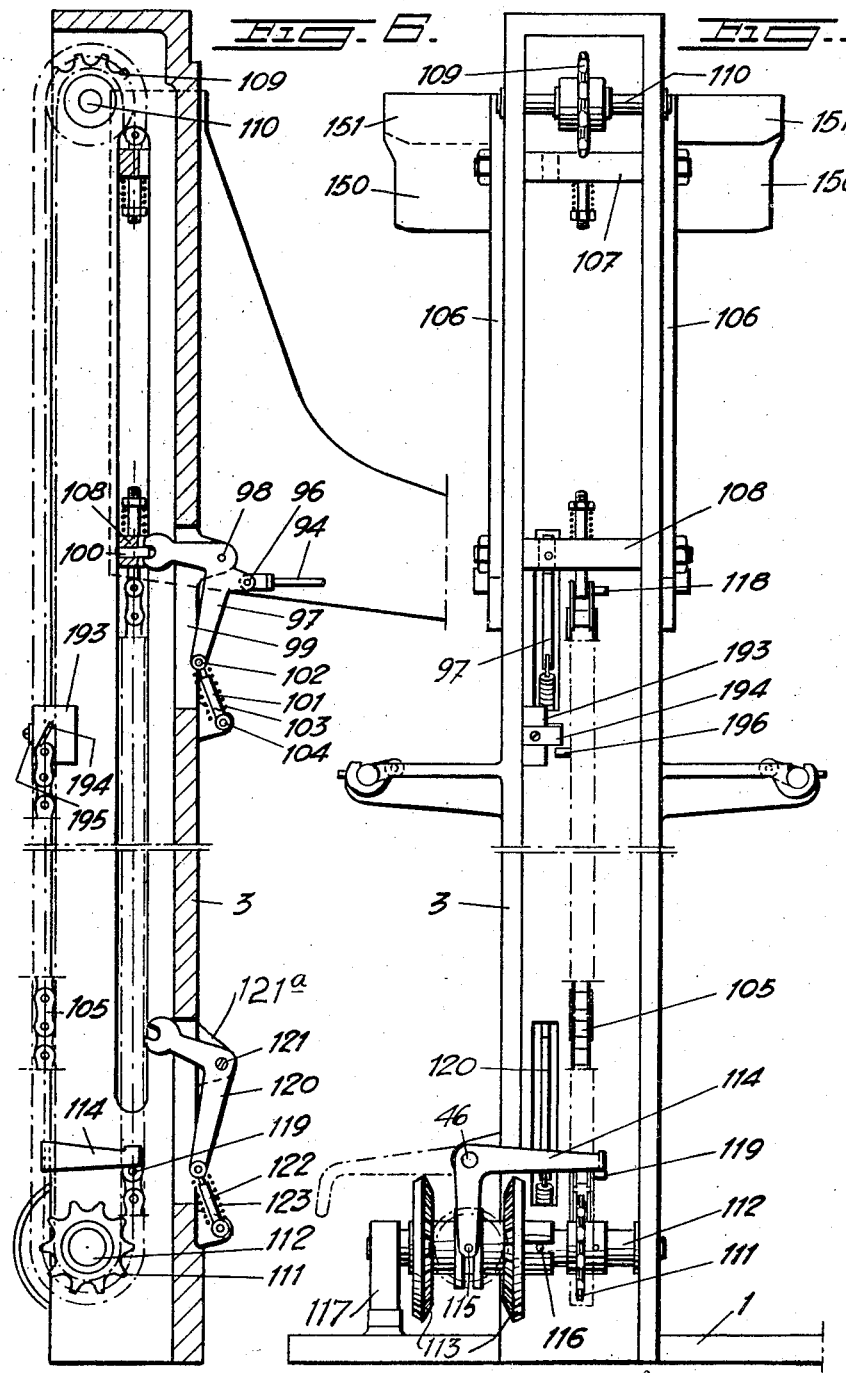
Inventors
Erik A. Landberg,
and Nils G. Y. Torphammar,
by Sommers & Young
Attorneys

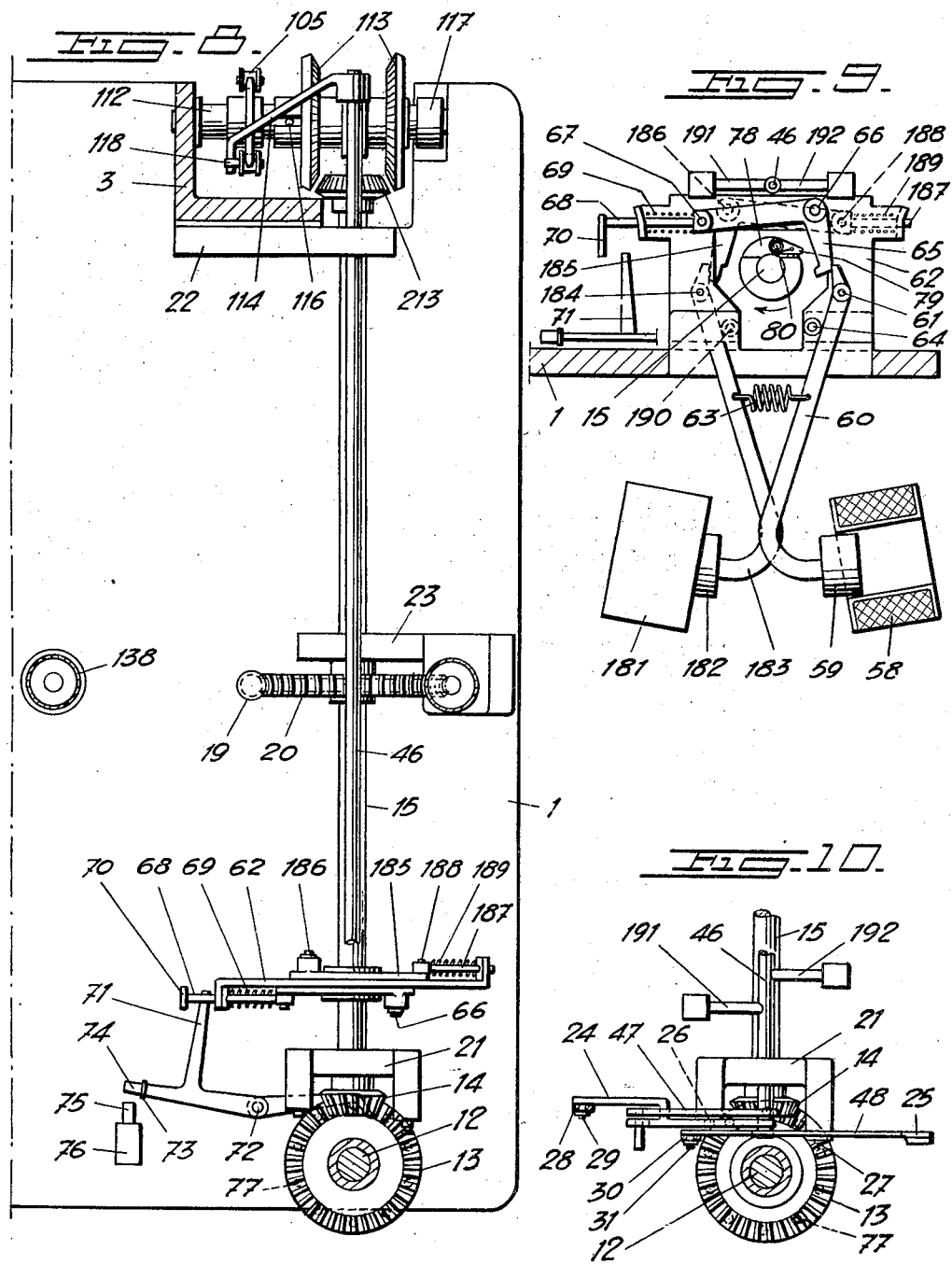

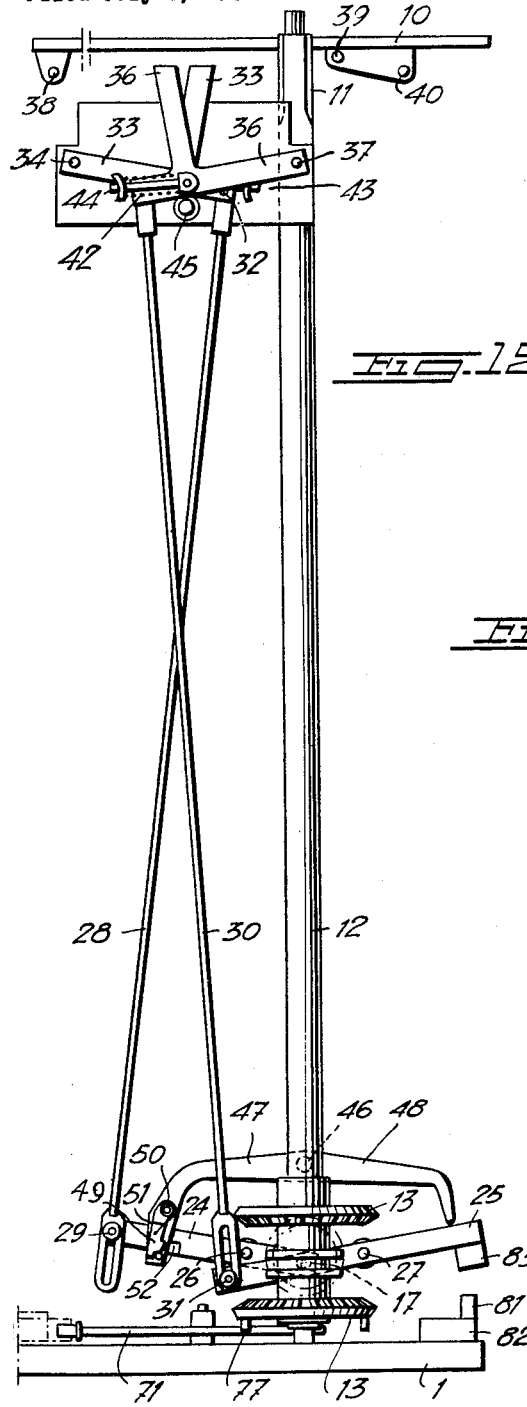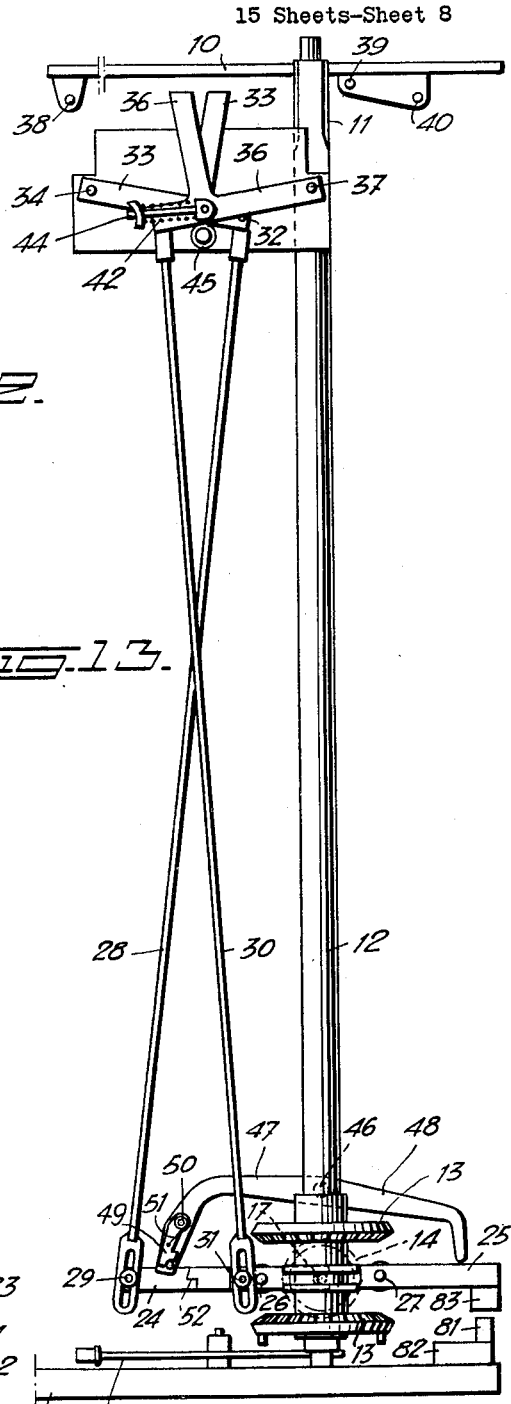

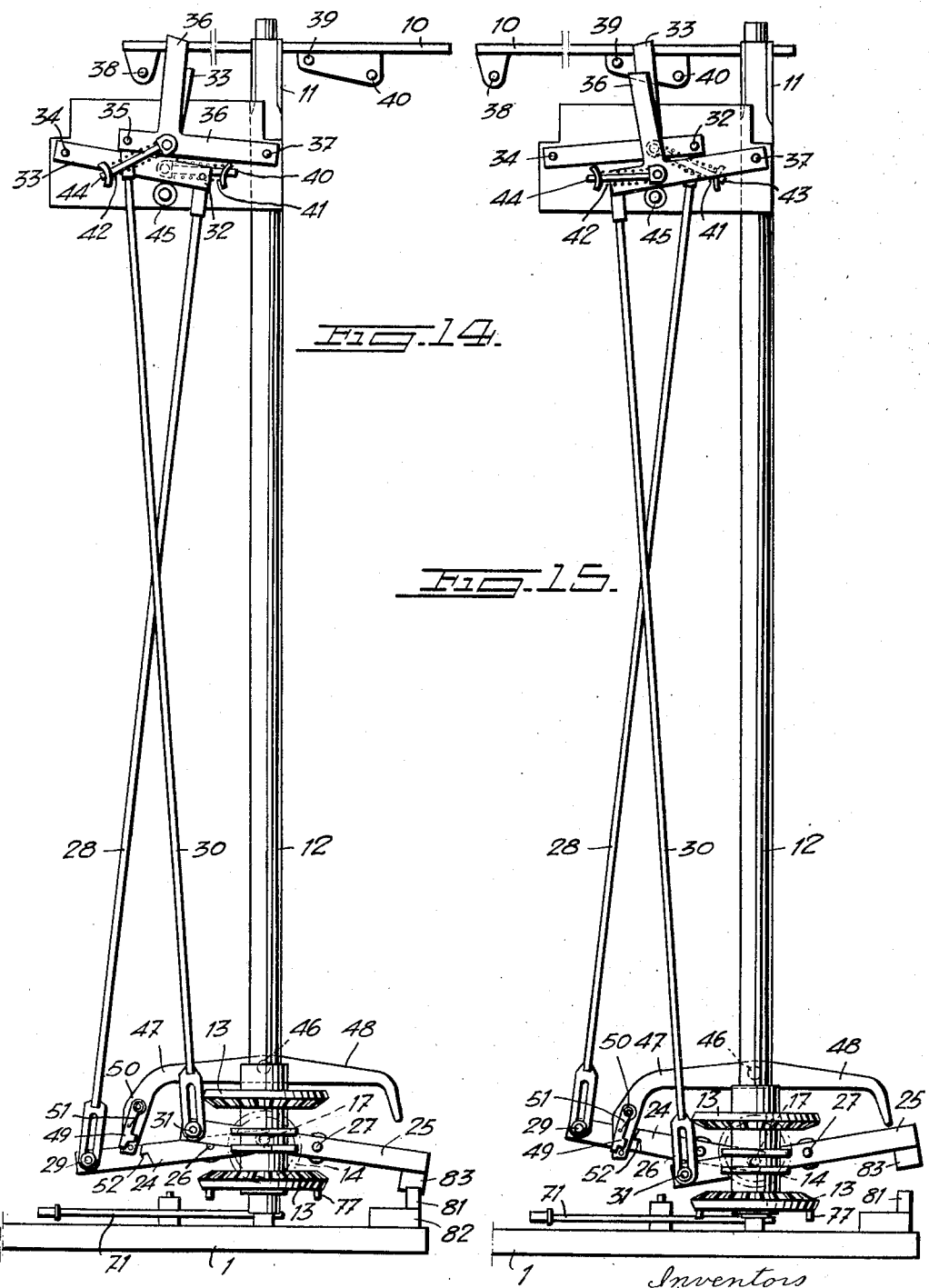

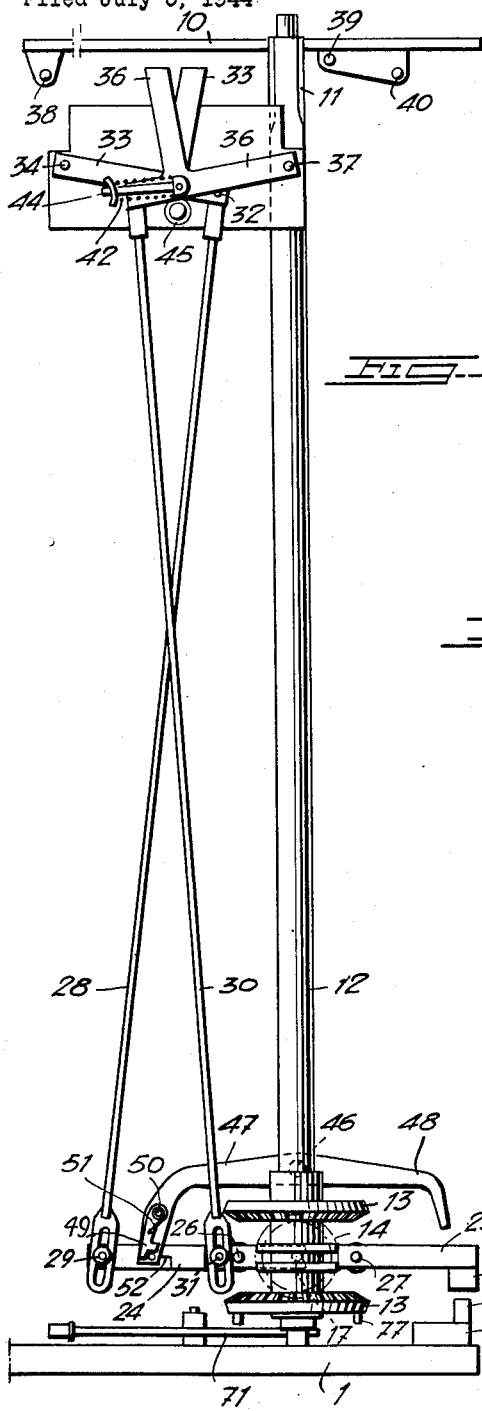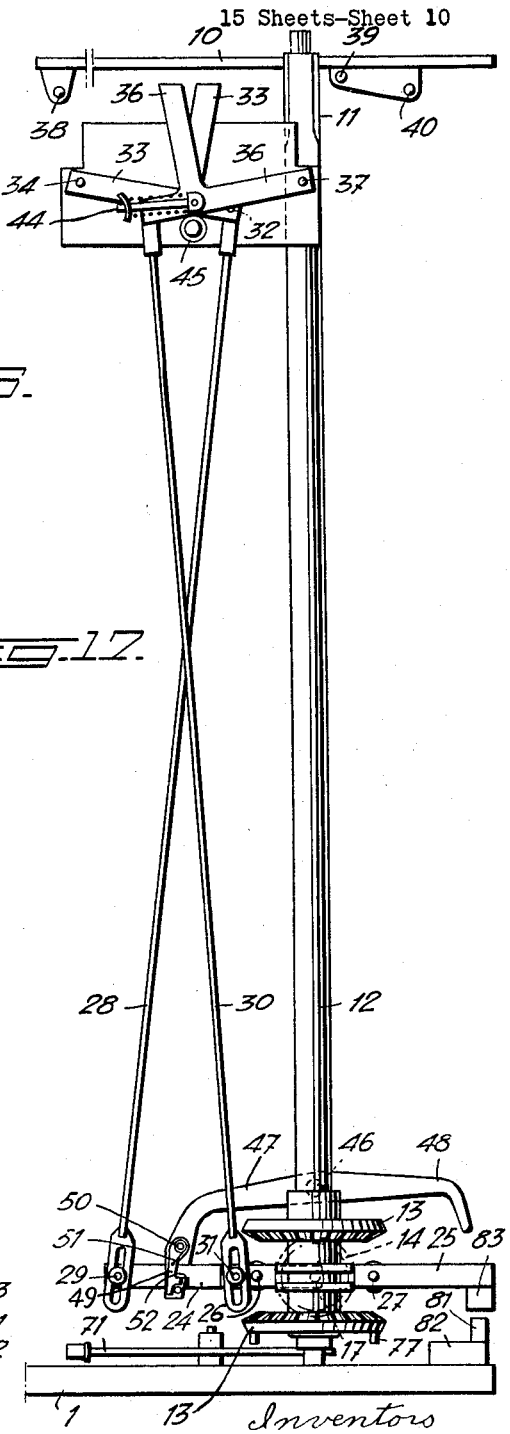

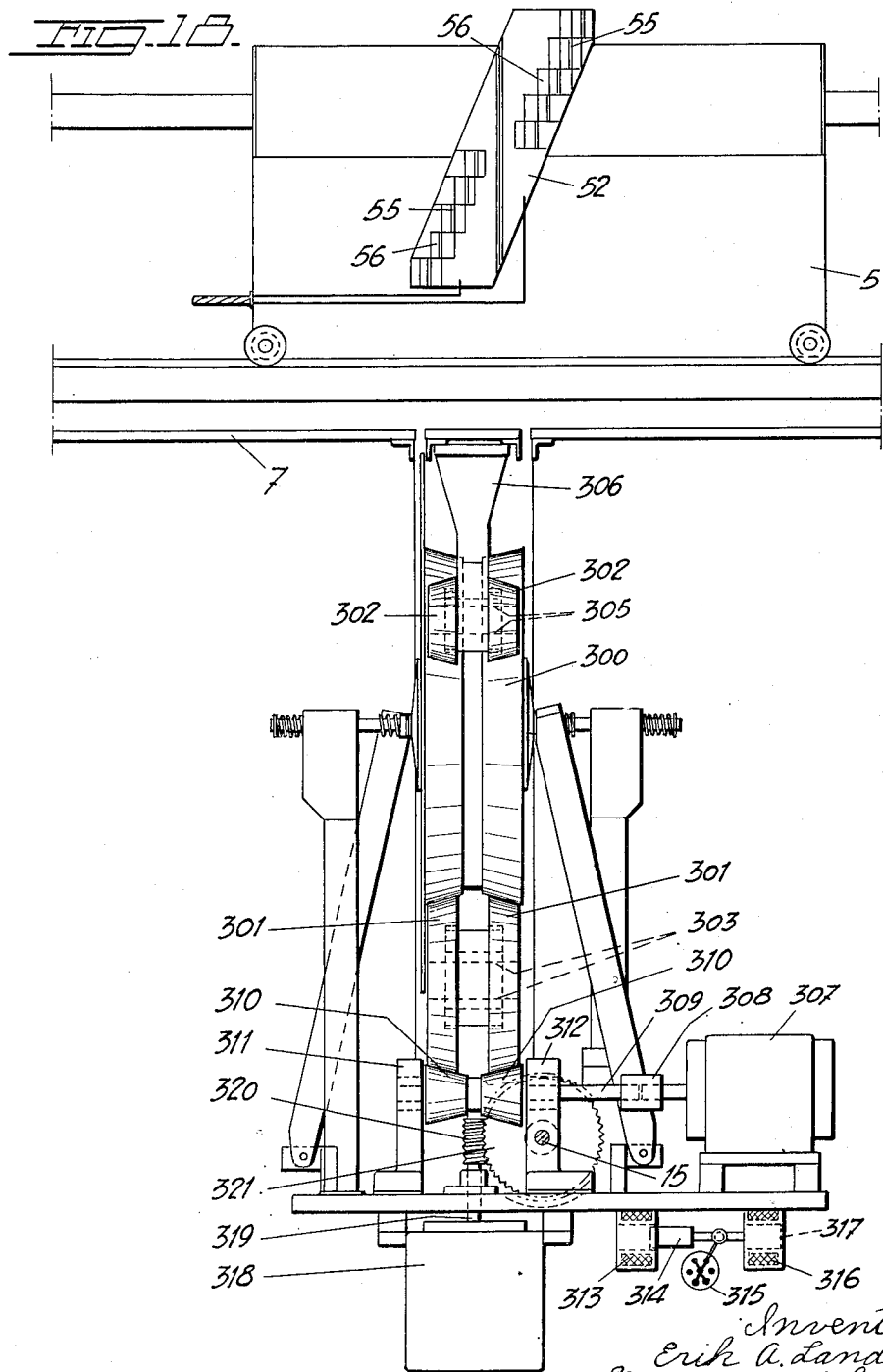

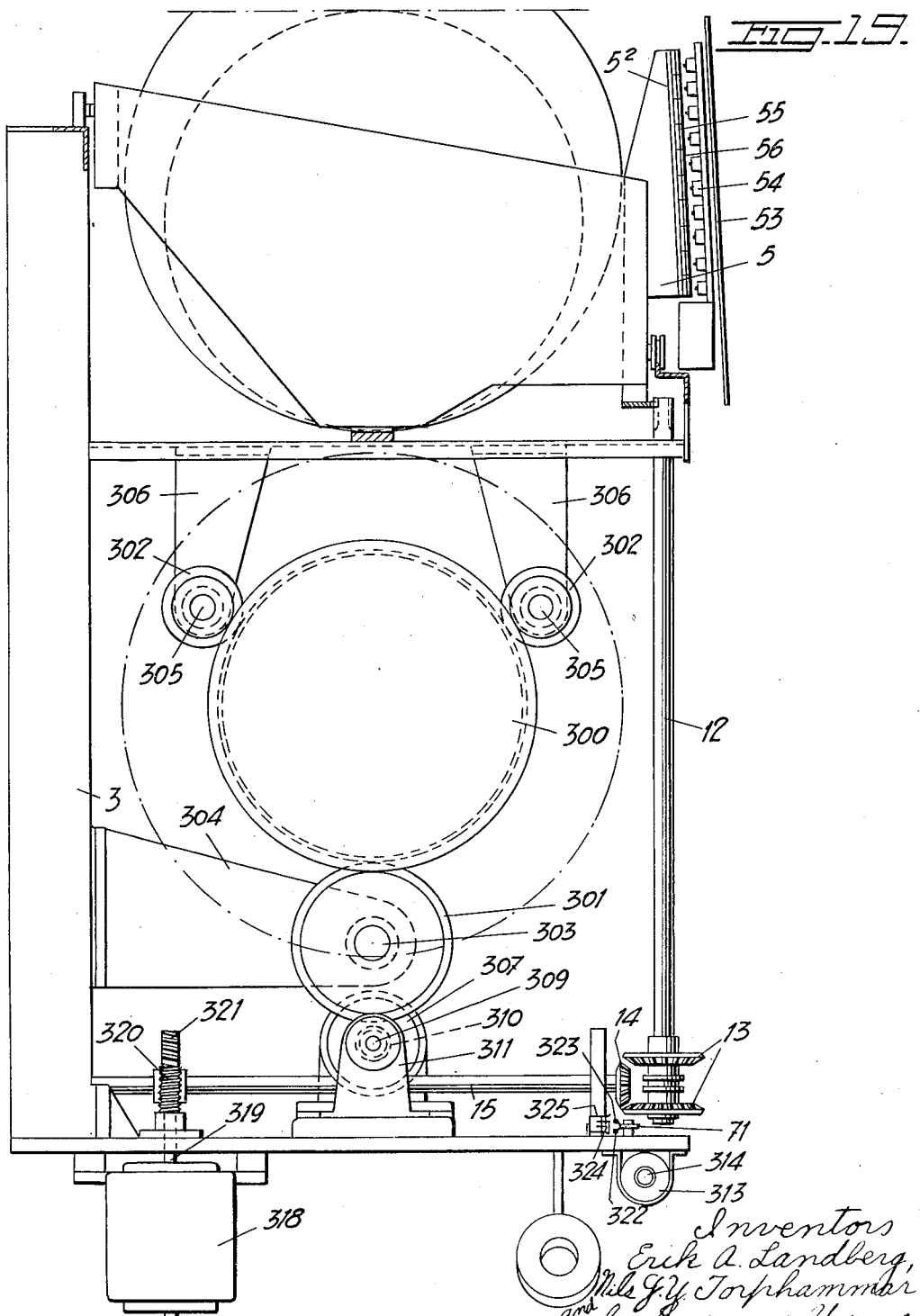

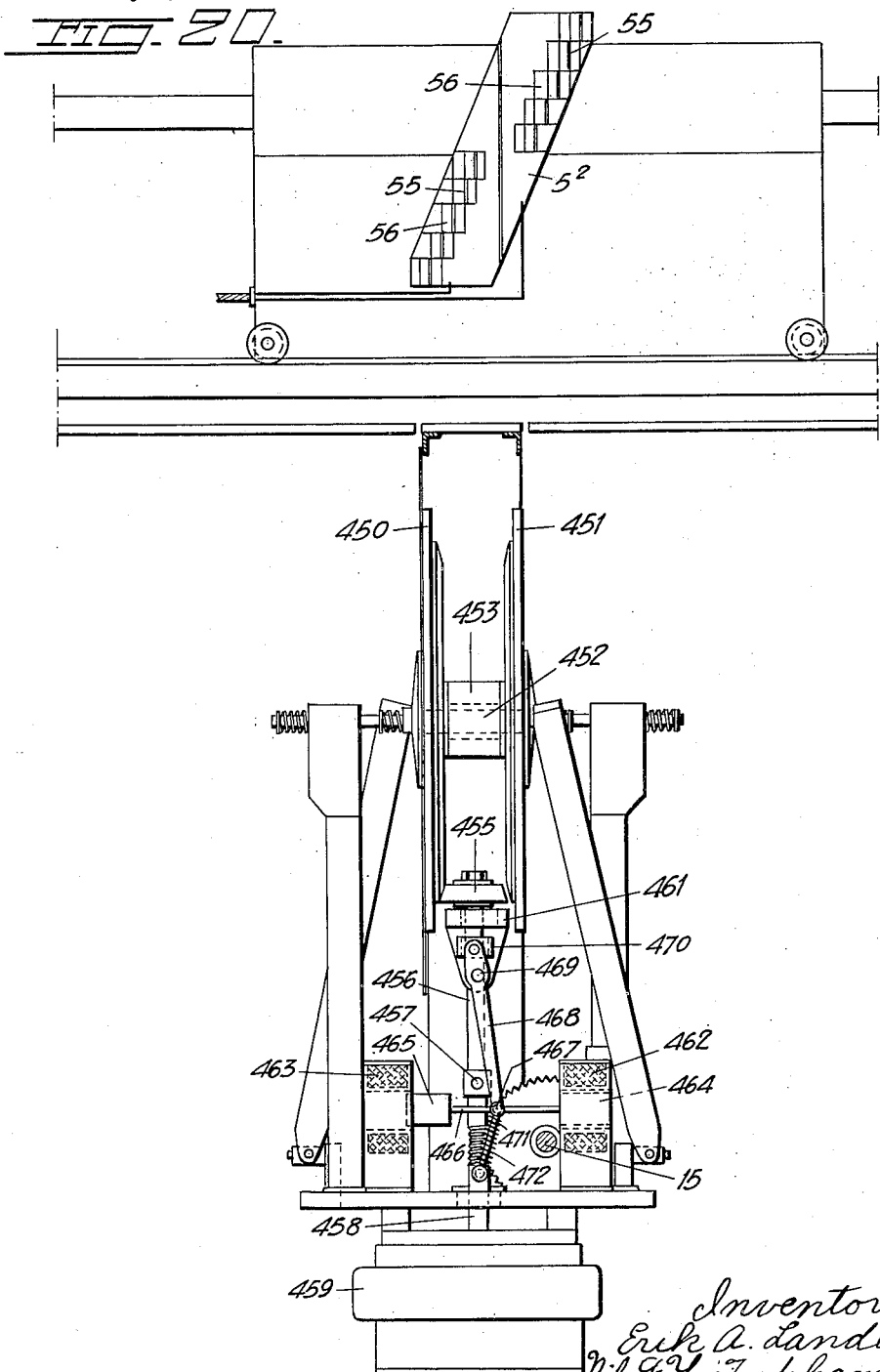

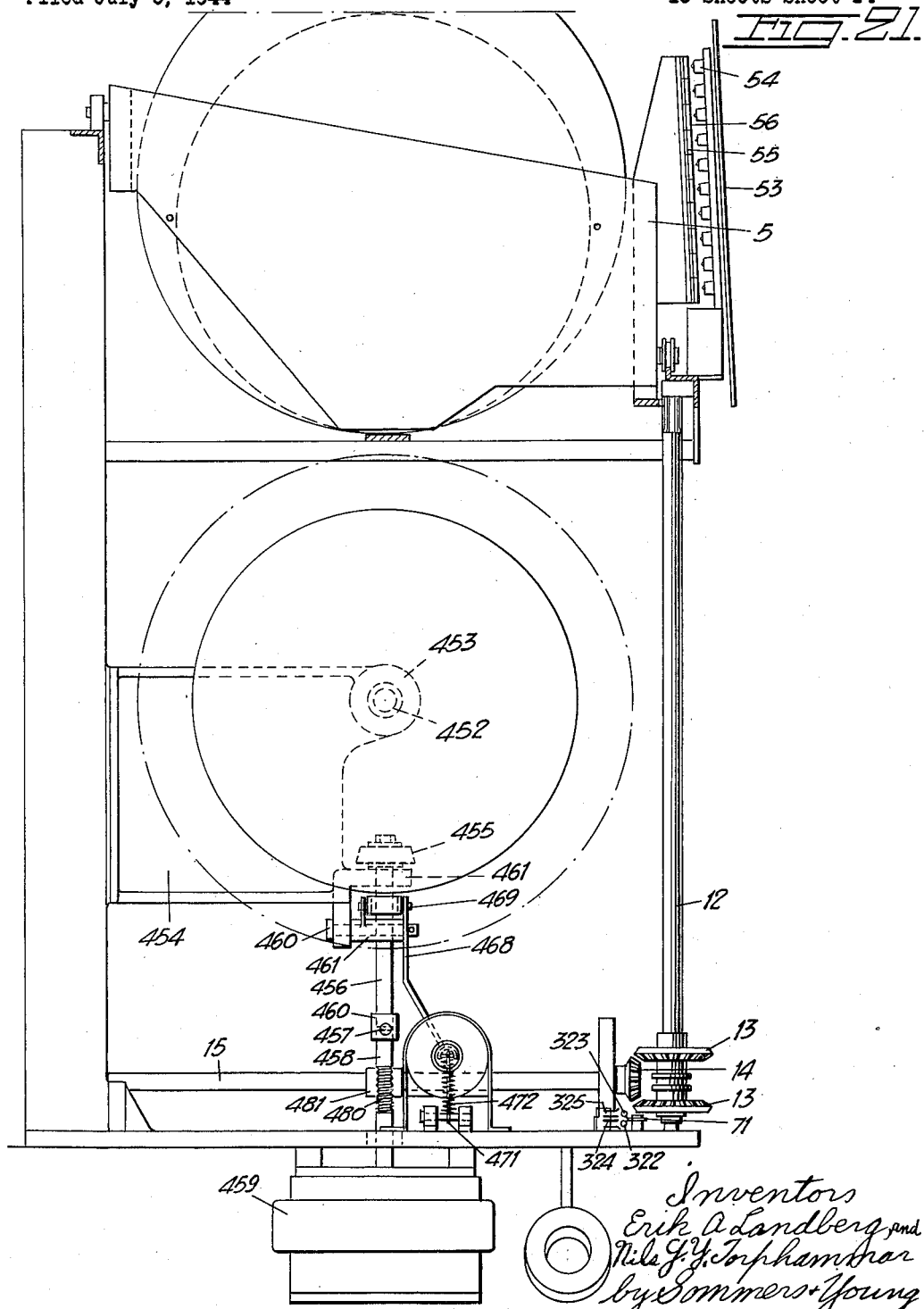

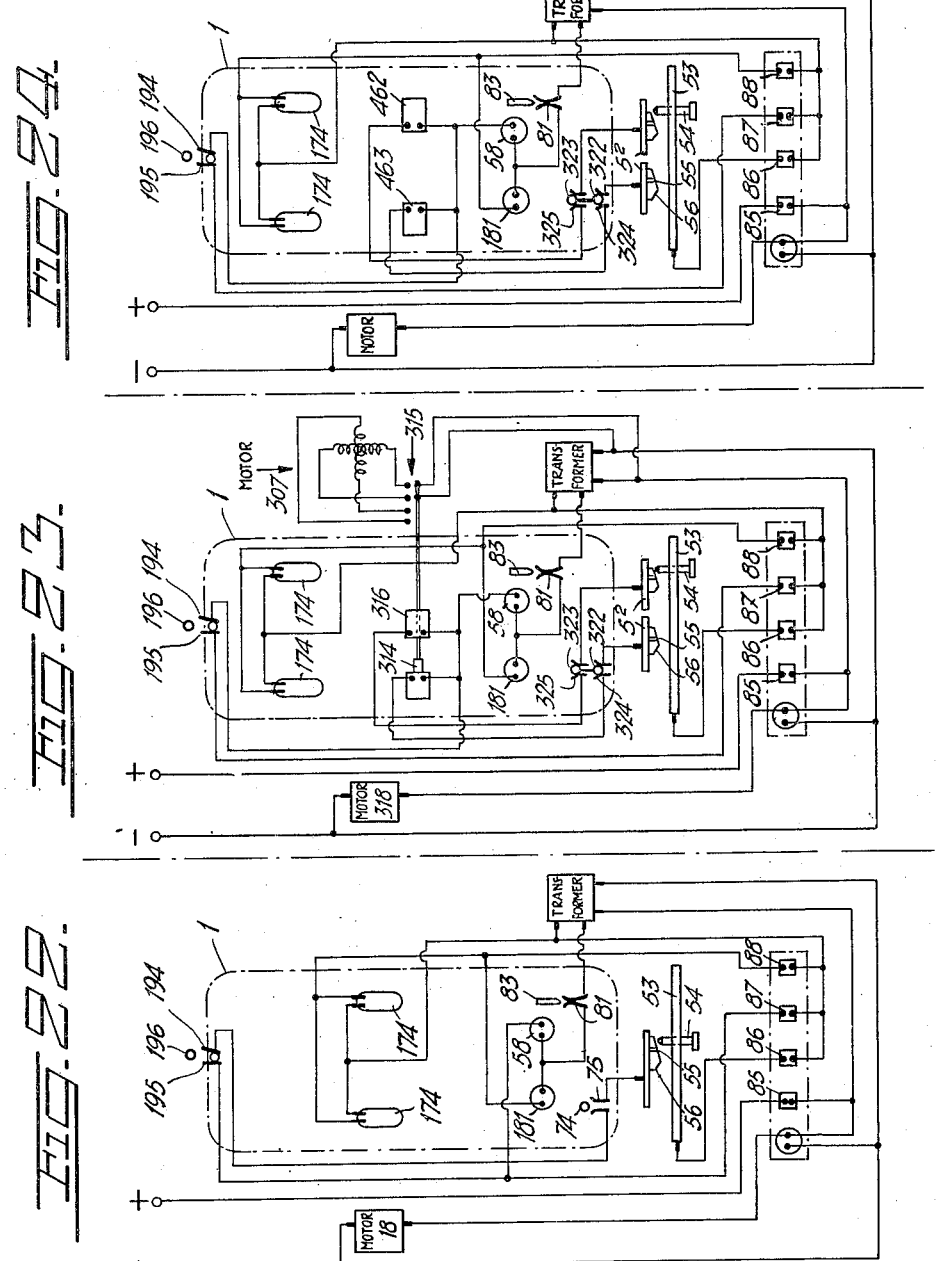

Patented July 11, 1950

2,514,701

UNITED STATES PATENT OFFICE 2,514,701

AUTOMATIC PHONOGRAPH

Erik Arne Landberg and Nils Gustav Yngve Torphammar, Trollhattan, Sweden

Application July 5, 1944, Serial No. 543,530
In Sweden July 10, 1943

18 Claims. (Cl. 274—10)

This invention relates to automatic phonograph of the type including a reciprocating record carriage and a selecting device by means of which records of two different sizes may be selected for playing on any desired side.

The object of the invention is to provide a phonograph of the above said type which permits playing of both sides of the records without requiring a turning of the records upside down.

An essential feature of the invention resides in the provision of a double playing mechanism including two oppositely facing record supporting surfaces each adapted to act in playing an individual one of the two sides of a record.

The two record supporting surfaces may comprise either two separate turn-tables or opposite sides of a single turn-table.

In the said firstmentioned case the record supporting surfaces may face from each other or to each other, and the respective turn-tables may, preferably, rotate oppositely, in which case their direction of rotation need not be reversed in connection with the change of record side to be played.

In the accompanying drawings Figs. 1-17 illustrate in detail an embodiment of the invention, including a carriage for records of two different sizes, whereas Figs. 18-20 show some modifications.

With reference to Figs. 1-17,

Fig. 1 is a front view of the phonograph in normal position,

Fig. 2 is a front view showing a large record in playing position.

Fig. 3 is a side elevation, partly in section, showing the apparatus in normal position as ready for playing records of the large size.

Fig. 4 is a side elevation, partly in section, showing a large record in playing position, Fig. 5 is a plan view, partly in section and with part of the carriage broken away, Fig. 5a is a side elevation of some details of Fig. 5, as seen from the rear side thereof.

Fig. 6 is a side elevation, partly in section, of bracket controlling means,

Fig. 7 is a rear view of said means,

Fig. 8 is a plan view, partly in section, of means for controlling the movement of the carriage, Fig. 9 is a side elevation of electromagnetically operable means for controlling the starting and the stopping of the playing of a record, Fig. 10 is a plan view of the front end of the control shaft and associated members, Fig. 11 is a detail view of the upper end of a tone arm, Figs. 12-17 are elevations of means for controlling the movements of the carriage, Fig. 18 is a front view and Fig. 19 is a side elevation of a modified embodiment, Fig. 20 is a front and Fig. 21 is a side elevation of another modified embodiment, Fig. 22 is an electric diagram of the electrical circuits of the embodiment shown in Figs. 1-17, Fig. 23 is a diagram of the electrical circuits of the embodiment shown in Figs. 18 and 19, and Fig. 24 is a diagram of the electrical circuits shown in Figs. 20 and 21.

The apparatus illustrated in Figs. 1-17 as an embodiment of the invention is built for fifty records, viz., fifteen of the large size and thirty-five of the small size. Of course, the apparatus may be constructed for any desired number of records and for any relation desired between large and small sized records without departing from the principle of the invention.

The main parts of the phonograph comprises a frame, a record carriage mounted to reciprocate on said frame, a double playing mechanism provided below the path of the carriage, a device for selecting any desired record and any desired side thereof, and means for removing the record selected from the carriage and delivering it to the position for playing the side selected, and restoring it to its seat in the carriage after the playing of said side is ended. The apparatus further includes means for special purposes, such as repetition and so on.

The frame comprises, essentially, a base plate 1, front and rear columns 2 and 3, respectively, and stays to interconnect said columns. Supported by said columns at the front and rear sides of the frame are a pair of rails 4 forming the path for the record carriage 5. On said rails the carriage may reciprocate in the east-west direction by means of small wheels or rollers 6.

To form a container for the records the carriage is divided by vertical partitions $5^1$ extending in the north-south direction, that is to say, at right angles to the direction of the path 4, into a plurality of compartments, one for each record. As the records available in the market are, generally, of two different sizes, it is preferred to dimension all of the compartments to suit the large-sized records and provide means for changing the compartments in a simple way to suit the small-sized records. In the drawing fifteen records of the large size and thirty-five records of the small size are indicated. The former are positioned to the left in the carriage, Fig. 1, and designated as a whole by the reference character $S_1$, as shown in Fig. 1, whereas the small-sized records are positioned to the right in the carriage and designated as a whole by the reference character $S_2$. The compartments are open at their tops to allow the records to be freely placed therein. They are also open at their bottoms to allow the automatic removal of the records to be played. To support the records as contained in the carriage a bar 7 is provided in the rigid frame below the carriage centrally with respect to the rails 4. The top surface of said bar is smooth so as to allow the records to slide easily thereon, as the carriage is moving in one direction or the other. The records are held in positions right above the supporting bar 7, as far as the larger records are concerned, by means of the distance pieces inserted between adjacent partitions at the front and rear side of the carriage, as will appear from Fig. 4, and, as far as the small records are concerned, by means of guide rods 8, Fig. 3, extending through apertures in the partitions. By adjusting these rods axially the number of compartments to receive small records may be arbitrarily increased or decreased.

The supporting bar is cut off at two points, so as to form two slots, as shown at 9 in Fig. 2. Said slots are adapted to permit removing a record at a time from the carriage and deliver it to the playing mechanism provided below the path of the carriage. One slot leads to a position for playing one side of the records and the other slot to a position for playing the other side. In order to prevent simultaneous discharge of records through both slots 9, the distance between the slots must not be equal to a whole multiple of the space between the records as contained in the carriage. It is thus evident that, when a record is situated right above one slot 9 or has descended therethrough, no record may stand right above the other slot or pass down therethrough. In the example shown the distance between the centers of the slots 9 represents 9½ record spaces of the carriage.

To impart the reciprocatory movement to the carriage a rack 10 is provided at the front surface of the carriage, said rack being engaged by a pinion 11 on the uppermost end of a vertical shaft 12 which may be rotated in one direction or the other according to the direction of movement of the carriage desired. Shaft 12 is geared at its lower end by means of a reversing gearing 13, 14 to a horizontal shaft 15 extending over the base plate 1 in the north-south direction which always rotates in the same direction. Said reversing gearing comprises a bevel gear 14 on the fore end of shaft 15 and a pair of bevel gears 13 slidably but not rotatably mounted on shaft 12 which may be displaced axially so as to move the one gear 13 or the other into mesh with gear 14. In addition, the pair of bevel gears 13 may be set to an intermediate position in which both of them are out of mesh with gear 14. The driving connection between gears 13 and shaft 12 is effected by means of a pin 16 on the shaft engaging an axial slot formed in the hub of gears 13. The axial displacement of gears 13 is effected by means of a pin 17 engaging into between a pair of flanges or collars provided on the hub of gears 13 which will be more nearly described hereinbelow. Rotation is imparted to shaft 15 from an electric motor 18 provided below the base plate 1 via a vertical worm-shaft 19 connected to the motor shaft which projects upwardly through base plate 1, and a spiral gear 20 on shaft 15. Shaft 15 is mounted in a fore bearing 21, a rear bearing 22, Fig. 8, and an intermediate bearing 23, Figs. 3 and 8.

The pin 17 to effect displacement of the pair of bevel gears 13 is controlled by two independently operating levers 24 and 25, mounted on stationary fulcrums 26 and 27, Figs. 12-17. Pivotally and, within certain limits, slidably connected to the outer (or left hand, Fig. 12) end of lever 24 is a link 28, inasmuch as an elongated slot thereof embraces a pin 29 carried by the lever. Similarly, another link 30 is connected by means of an elongated slot and a pin 31 to the corresponding (left hand) end of lever 25. Said links 28 and 30 extend upwards to the vicinity of the path 4 of the carriage. The upper end of link 28 is pivoted at 32 to one horizontal arm of a lever 33 essentially shaped as an upside-down turned T the other horizontal arm of which is mounted on the stationary fulcrum 34. The upper end of link 30 is pivoted at 35 to a similar lever 36 having its fulcrum at 37. The upturned arms of the levers 33, 36 project freely upwards for cooperation with studs 38, 39, 40 attached to a suitable part of the carriage, such as rack 10. The levers 33, 36 are loaded by coil springs 41, 42, mounted on links 43, 44 which are so connected with the levers and so arranged as to form toggle joint levers in conjunction therewith, thereby permitting the springs to shift the levers readily between their extreme positions on opposite sides of the center lines of the two toggle joints and maintain them in the new position. Extending below the levers is a resilient stop 45, Fig. 12, adapted to softly check the downward movement of the levers.

The levers 24, 25 which may be operated by means of the links 28, 30 in a way to be hereinbelow described, may also be operated by means of a control shaft 46 located above shaft 15 and extending in a direction parallel therewith. Said control shaft is mounted in the fore and rear bearing posts 21, 22 of shaft 15. Right above the spiral gear 20 the control shaft is crank-shaped, as shown in Fig. 3, in order not to touch the spiral gear 20. The operation of the levers 24, 25 under the control of shaft 46 is effected through the intermedium of a pair of arms 47, 48 rigidly connected to or formed integrally with each other. Arm 47 operates lever 24 indirectly, that is to say, by means of a pawl 49 fulcrumed to the arm at 50 and loaded by a spring 51. Lever 24 is formed with a tooth 52 (Fig. 13) adapted to be engaged by pawl 49. Arm 48, on the contrary, acts directly on the upper edge of an arm of lever 25 situated to the right of the fulcrum 27, Fig. 12.

The movement of the carriage on its path 4 is controlled electrically by means of a system of keys allowing the setting of any desired record to any of the slots 9. Provided at the frame of the apparatus in front of the path 4 is a keyboard 53 including two keys 54 for each record contained in the carriage, namely one key for each record side. In the example shown the keys are arranged as ten vertical and ten horizontal rows (see Fig. 1). The space between the vertical rows represents, for instance, five record spaces in the carriage, whereas the space between the horizontal rows depends on the dimensioning and positioning of the contact members on the carriage adapted to be engaged by the keys. To this end the carriage is provided with a panel $5^2$ carrying a contact element 55 on a level with each horizontal row which is adapted when engaging a depresser key of the respective horizontal row to close an electric circuit for stopping the carriage. The contact members 55 each comprises a vertical thin bar or lamina embedded in an insulating key restoring cam 56 in such a way as to have one vertical edge exposed in the middle of a gently sloping (right hand) key restoring surface of the cam adapted to act during the forward movement of the carriage (to the right in Fig. 1). The cam also comprises a more abruptly sloping (left hand) key restoring surface adapted to act during the backward movement of the carriage (to the left in Fig. 1). The ten contact members 55 are arranged as an upper group and a lower group, each comprising five contact members. The upper group is adapted to control the setting of the records selected into register with one slot 9 and the lower group is adapted to control the setting of the records selected into register with the other slot 9. In other words, the upper group controls the setting of the carriage for playing one side of the records and the lower group controls the setting of the carriage for playing the other side of the records. To this end the horizontal space between any contact member of the upper group and the corresponding contact member of the lower group is equal to the distance between the slots 9, that is to say, 9½ record spaces, see Fig. 2. In each group adjacent contact members are displaced horizontally with relation to each other by a distance corresponding to the record space, as will also appear from Fig. 2. In addition, the contact members 55 are positioned so that when the uppermost key of the upper group engages the key numbered 1, that is to say, the upper left hand key of the keyboard, the record numbered 1 (i. e. the extreme right hand record in the carriage), is in register with the left hand slot 9.

The contact members of each group are electrically connected to a common bus-bar mounted on an insulating base 57, Fig. 5. The circuit controlled by the keys 54 in cooperation with the contact members 55 includes an electromagnet coil 58 situated below the base plate 1, as shown in Fig. 9. Coil 58 is provided with a movable core 59 carried by a lever 60 fulcrumed at 61 to a separate frame 62 mounted on the base plate. Said lever 60 is acted on by a spring 63 tending to pull the core out of the coil. Said movement is limited by a stop 64. The lever 60 forms above the fulcrum 61 a detent to cooperate with a depending arm of a bell crank lever 65 fulcrumed at 66 to frame 62. The other, substantially horizontal arm of said bell crank lever is pivotally connected at 67 to a link 68 guided by an aperture in an upturned flange of frame 62. Between said flange and the respective end of the bell crank lever the link carries a coil spring 69. The bell crank lever 65 and the link 68 with its associated spring 69 represent a toggle joint which when acted on in one direction or the other may be quickly shifted under the influence of the spring to a position on the opposite side of the center line of the toggle joint and maintained in said position. On its free end, outside the guide flange, link 68 is provided with a laterally projecting arm 70 for controlling a multi-armed lever 71 fulcrumed at 72. Said lever carries outside an insulation 73 the movable contact 74 of a switch inserted in the circuit of coil 58, the stationary contact of which is shown at 75, Fig. 8, as mounted in an insulating support 76. The opening of said switch is controlled by arm 70. The closing of the switch is controlled by the lower gear of the pair of bevelled gears 13, said lower gear having to this end a set of pins 77 on its under side adapted to operate an arm of lever 71. Said pins 77 are of such a length as to be capable of operating the lever 71 only when the pair of bevelled gears 13 is in its lowermost position, that is to say, with the upper wheel 13 in mesh with the gear 14 for driving the carriage forwardly (i. e. from the left towards the right). In the other (or upper) extreme position of wheels 13 the pins 77 do not reach down to lever 71.

The bell crank lever 65 above described forms a vault above the horizontal driving shaft 15 of the apparatus. In the plane of the lever 65 the shaft 15 carries a releasing device 78 comprising a spring controlled pawl 79 mounted at 80 which is adapted to engage the inwardly pointing hook-shaped end of the depending arm of bell crank lever 65 for the purpose to be hereinafter set forth.

The circuit of the coil 58 includes a further point of break, comprising a pair of normally closed contacts 81, Fig. 12, mounted on a support 82 which may be forced apart by means of a knife 83 of insulating material carried by the right hand end of lever 25.

The electrical appliances belonging to the keyboard include in addition to the keys 54 a contact box 84, Fig. 3. Said box contains a plurality of switches for special purposes which may be controlled from the front side of the keyboard, namely, a switch 85 for starting and stopping the motor 18, a switch 86 for opening the circuit of the keyboard, a switch 87 for repeating purposes, a switch 88 for immediately interrupting the playing of a record, and a lamp switch 89.

In order to enable the carriage to be exactly stopped in a position to bring a selected record right above the one slot 9 or the other, as the case may be, the rack 10 of the carriage is formed with two teeth every record space, so that there will be a tooth for each side of every record. To positively lock the carriage against movement from the moment at which a record is removed from the carriage for playing purposes to the moment at which the record selected has been restored after playing to its seat in the carriage, there is a detent 90 adapted to engage the rack 10. Said detent is mounted to slide towards and away from the rack on a bearing 91 under the control of a lever 92 mounted on the pivot 93, Fig. 3, and a link 94 extending in the north-south direction of the apparatus which connects a pivot pin 95 on the rocking lever 92 with a pivot pin 96 on a bell crank lever 97 pivoted at 98 to a rear column 3 of the frame of the apparatus. Said bell crank lever includes a depending arm extending from the pivot pin 98 down along said column 3 and a rearwardly extending arm which projects into the hollow column through an aperture 99 in the wall thereof, as shown in Fig. 6. Said last-mentioned arm is fork-shaped for its engagement with a projection 100 of an elevator mounted in the column which is adapted to receive a record at a time from the carriage through one of the slots 9 and move it to the playing mechanism and restore the record to the carriage after completed playing. In order to accomplish the functions desired in a ready and safe manner the bell crank lever 97 forms part of a toggle joint lever which in addition to said lever 97 includes a link 101 of automatically variable length pivoted to the depending arm of the bell crank lever at 102 and a compression spring 103 surrounding said link. The other end of link 101 is pivoted to the column 3 at 104.

The above said record elevator comprises an endless chain 105 mounted in the frame-like hollow column 3 and associated tightening means, and a pair of brackets 106 carried by said chain each of which is adapted to receive a record at a time through an individual one of the slots 9. Said brackets to this end are positioned in the same vertical plane as the respective slots and are of a thickness equal to that of the slots. The two brackets are guided along two opposite sides of the column 3, as shown in Fig. 7. They are rigidly connected together by means of an upper bolt 107 and a lower bolt 108. The endless chain is supported by an upper sprocket wheel 109 the shaft 110 of which is loosely mounted in the frame, and a lower chain wheel 111, the shaft 112 of which is driven. To this end the shaft 112 is connected through the intermedium of a combined reversing and disengaging gearing to the driving shaft 15. Said gearing includes a bevel gear 213 on the rear end of shaft 15 and a pair of bevel gears 113 slidably mounted on shaft 112. The displacement of said pair of bevel gears is effected by means of a bell crank lever 114 carried by the control shaft 46 which by means of a pin 115 engages into between a pair of flanges provided on the hub of gears 113. In order to permit the displacement the hub is formed with an axial slot engaged by a pin 116 on shaft 112. Shaft 112 is mounted, partly in the wall of column 3 and, partly, in a bearing 117 provided outside the pair of bevel gears 113. Thus, the bell crank lever 114 receives its motion from the control shaft 46 but may, in addition, be operated by means of studs 118 and 119 laterally projecting from the chain.

Provided at the lower end of the column 3 is a toggle joint lever similar to the toggle joint lever 97/101 above described. Accordingly, said lower toggle joint lever includes a bell crank lever 120 mounted at 121, a link 122 of automatically variable length and a spring 123. The upper arm of bell crank lever 120 which projects through an aperture in the wall of column 3, is also fork-shaped for its cooperation with projection 100 of the chain. Said projection is represented in the drawing by a stud fastened to the lower connecting bolt 108 of brackets 106.

Brackets 106 are adapted when in their extreme upper position to fill up the gaps represented by the slots 9 so that said gaps may not form any hindrance to the records when sliding with their edges on the bar 7 during the movement of the carriage. It is to be noted that in this case the upper edges of the portions of the brackets filling up the slots should be exactly on a level with the upper surface of the supporting bar 7. This result may be obtained by the action of the upper toggle joint lever 97/101 when influenced by the projection 100 in a way to be hereinbelow described. The lower toggle joint lever 120/122 acts in a similar way to force the brackets to their lowermost position under the influence of the projection and maintain them in this position under the influence of spring 123.

For guiding the records during their downward and upward movements the brackets are provided with guiding levers 124 pivoted at 125 and acted on by springs 126 which tend to force said levers upwardly against the edge of the records carried by the brackets. In the uppermost position of the brackets said guiding levers are held out of the path of the records contained in the carriage by means of stops 127. In all other positions of the brackets upward swinging of the brackets are limited by stop pins 128 fastened to the brackets which engage slots formed in the guiding levers. To fix the uppermost position of the brackets with relation to the bar 7, the brackets are provided with abutments 129 at their sides remote from each other, as will appear from Figs. 1 and 3.

The main parts of the playing mechanism comprises two turn-tables 130, 131 having their record supporting surfaces remote from each other and otherwise so located that the surface of turn-table 130 is adapted to receive records descending through the left hand slot 9 and the surface of turn-table 131 is adapted to receive records descending through the right hand slot 9. Both turn-tables are carried by a common shaft 132 mounted in a bracket 133 fastened to the column 3. On their sides facing each other the turn-tables are provided with bevelled friction surfaces engaged by a conical friction gear 134 on the upper end of the worm shaft 19. Said last-mentioned shaft is mounted in the bracket 133, as shown in Fig. 2. It is thus seen that the unidirected rotation of shaft 19, as indicated by an arrow in Fig. 2, causes the two turn-tables to rotate in opposite directions.

Pressing of the records against the turn-tables is effected by means of pressure discs 135, one arranged in front of each turn-table. The pressure discs are supported by shafts 136 lying in axial alinement with the shaft of the turn-tables. Said shafts 136 are slidably mounted in bearings arranged in housings 137 supported by posts 138. Each shaft 136 carries besides its respective pressure disc two coil springs 139, 140, the former being inserted between the respective bearing 137 and a collar 141 on the outer end of the shaft, and the latter being inserted between the pressure disc and a collar 142 on the shaft. The pressure disc itself is clamped between the spring 140 and a collar 143.

The housing 137 contains in addition to the bearing for the respective pressure disc shaft 136 a bearing for a shaft 144' or 144" situated below shaft 136 which extends horizontally in a direction at right angles thereto towards the rear columns of the frame of the apparatus where it is mounted in bearings 145. Within the housing 137 the shaft 144' or 144" may positively control the shaft 136 of the respective pressure disc by means of a lever 146 mounted at 147 which is turned on rotation of its respective shaft 144' or 144", in its turn imparting an axial movement to the shaft of the respective pressure disc.

The rotation of each shaft 144' or 144" is effected by the cooperation between a roller 148 carried by a laterally projecting arm 149 of the shaft and cams 150, 151 carried by the brackets 106. Cams 150 control the rotation of shafts 144' and 144" for preparing the playing of small-sized records, cams 151 control the rotation of the shafts for preparing the playing of large-sized records. The two cams belonging to each shaft are displaced with relation to each other in the direction of the shafts. The shafts are axially slidable in order to bring their rollers into register with the cams desired and set the tone arms hereinafter to be described to proper starting position for playing small or large records. The displacement is controlled by a cam 152, Fig. 5, attached to the carriage, through the intermedium of toggle joint levers connected to the shafts 144' and 144". The toggle joint lever of shaft 144' comprises two arms 153, 154 rigidly connected together by their shaft 155, the former of which carries a pin 156 engaging a circular groove in shaft 144', a link 157 of automatically varying length pivoted to arm 154 at 158, and a compression spring 159 surrounding said link. Link 157 is mounted to turn on the stationary pivot 160. The toggle joint lever belonging to shaft 144'' comprises similarly a pair of arms 161, 162 rigidly connected together by their shaft 163, the former of which carries a pin 164 in engagement with an annular groove in shaft 144'', a link 165 of automatically variable length pivoted to arm 162 at 166, and a compression spring 167 surrounding said link. Link 165 has a stationary pivot at 168.

Cam 152 is adapted on the movement of the carriage from the left to the right to act on the properly lengthened pivot pin 158 as well as on a special pin 208 in order to effect a shifting of the shafts 144', 144'' from their normal positions (in which they are set for the playing of small records) to the position required for the playing of large records. Formed integrally with cam 152 is a gentle sloping cam 152' adapted on the return stroke of the carriage from the right to the left to act on the pivot pins 158 and 166 with a view to restoring the shafts 144' and 144'' to their normal positions.

The cam 152 may be set to different positions on the carriage according to the number of large and small records it is desired to place in the carriage. In order to obtain consistency with the keys the cam may, for instance, be settable in steps each representing five record spaces. The guide rods 8 for keeping the small records centered with respect to the supporting bar 7 should, of course, be adjusted accordingly.

The shafts 144', 144'' also form control shafts for those levers which support the sound boxes with the associated needles by means of which the playing is carried out. For each turn-table there is such a tone arm 169. The tone arms are mounted on the base plate 1 by means of universal joints including for each arm a shaft 170 parallel with the path 4 of the carriage, a cube 171 mounted thereon and a pair of journal pins 172 disposed at right angles to shaft 170 by means of which the tone arm is mounted on the cube. At its upper end each tone arm carries a sound box 173 with needle carrier and a mercury switch 174.

For its cooperation with the respective control shaft 144' or 144'' the tone arm carries below the sound box on its surface remote from the turntable a bracket-shaped projection 175 formed with an upwardly pointing arm. Fastened to the side of the projection remote from the bearing housing 137 near the lower end of the upstanding arm is a plate spring 176 which extends upwardly along the upstanding arm of projection 175 and is shaped at its upper end as a hook projecting inwardly above the respective shaft. Said spring forms when its untensioned state a certain angle with said arm, as shown in Fig. 4, and may be put under tension by forcing it into contact with the arm of projection 175. The tone arm is adapted during its movement from the periphery of a record towards the centre thereof to move along the shaft 144' or 144'', as the case may be. Each of these shafts is formed along the respective length with a recess extending to an axial plane. In other words, half the section of the shaft is cut away along this length. At the bottom of this recess a bar 177 is mounted which projects with one longitudinal edge to a certain extent beyond the periphery of the shaft. On its end remote from the bearing housing 137 said bar is formed with a short recess 178 in its outer edge. The bar 177 acts as a crank or cam adapted upon the rotation of the respective shaft to impart a certain movement to the tone arm away from and towards the turn-table and a record held thereagainst. Said recess 178 determines the normal or starting position of the tone arm when playing is to take place and has also for its purpose to put spring 176 under tension when after a completed playing operation the tone arm is restored to said normal or starting position. The object of the spring is to displace the tone arm to bring its needle into engagement with the beginning of the spiral groove of the record so as to initiate a playing operation.

To restore the tone arms to their starting positions after a playing operation is ended a spring controlled lever is provided in connection with each tone arm. Said lever includes an arm 179' bearing against the tone arm which under the influence of a spring 180 surrounding the shaft of the lever tends to turn the tone arm in the direction away from the center of the turn-table, and an arm 179'' adapted to be operated by the brackets 106 with a view to removing the arms 179' from the tone arms.

The mercury switches 174 as provided at the upper ends of tone arms are included in the circuit of an electromagnet coil 181 which is arranged in a way similar to that hereinbefore described with respect to the coil 58 but situated on the opposite side of the vertical plane through shaft 15, see Fig. 9. Coil 181 acts on a movable core 182 supported by the lower end of a lever 183 which constitutes above its pivot 184 a detent situated on the opposite side of shaft 15 to the detent of lever 60. The detent of lever 183 is adapted to engage the depending arm of a bell crank lever 185 pivoted at 186, the other or horizontal arm of which represents together with a link 187, pivoted to lever 185 at 188, and a spring 189 surrounding said link, a toggle joint lever similar to the toggle joint lever designated by 65/68 but pointing in the opposite direction and not including any member corresponding to arm 70 thereof. The lever 183 supporting the core 182 is acted on by the same spring 63 acting on the coil supporting lever 60, inasmuch as said spring connects the two levers 60 and 183 to each other. In order to check the swinging motion of lever 183 under the influence of its spring an elastic stop 190 is provided.

Above the two toggle joint levers 65/68 and 183/187 the control shaft 46 carries arms 191 and 192 provided with rubber heads which are adapted to be operated by said toggle joint levers when shifted to their upper positions in order to turn the control shaft 46 a certain angle in the one direction or the other.

As hereinbefore stated, the keyboard includes in addition to the keys 54 a set of switches 85—89. It is already stated that the switch 85 controls the starting and stopping of motor 18. Of the remaining switches, 86 controls the circuit that is normally closed when a key 54 strikes any contact 55. By means of switch 86 this circuit may be opened allowing the carriage to move to its extreme right hand position without stopping at any key depressed, to be then again returned to its starting position in regular order. Switch 87 controlling the repetition operation is inserted in a circuit for energizing the coil 58. Said circuit includes a switch 193 provided at the column 3 which consists of two normally open contact pieces 194 and 195 adapted in the uppermost position of the brackets 106 to be closed by a movable contact 196 carried by chain 105.

The switch 88 controls a circuit for energizing the coil 181 when it is desired to interrupt the playing of a record immediately. Said switch 88 is provided with a restoring spring adapted to restore the switch to normal position automatically, as soon as the switch is released by the operator. The other switches described are constructed to be restored by hand.

The operation of the apparatus above described is as follows:

The reciprocatory movement of the carriage is controlled by means of the reversing gearing 13/14. Normally, the carriage is in its extreme left hand position as seen from the front of the apparatus. In this position the studs 38, 39, 40 and the levers 36, 33 by means of which said studs control the reversing gearing are so related to each other as shown in Fig. 15. The pair of gears 13 are in their lowermost position in which the upper gear is in mesh with the driving gear 14, ready for moving the carriage forward, i. e. to the right. On starting the motor 18 by closing the switch 85, the carriage will, therefore, move to the right. As soon as the stud 39 strikes the lever 33 the associated spring 41 will be put under tension and shift the toggle joint lever 33 to its lower position. This, however, will have no influence on the position of the pair of gears 13, since the link 28 that is pushed downwards by the said shifting of lever 33 will only slide on pin 29 by means of its elongated slot from the position shown in Fig. 15 to the position shown in Fig. 12 without operating the lever 24. Provided there is no key depressed, the carriage will continue to move to the right until reaching its extreme right hand position. On reaching this position the toggle joint lever 36 is operated by the stud 38 and immediately shifted to its upper position under the influence of its spring 42, thereby pulling the link 30 upwards. Link 30 moves pin 31 and swings lever 25, causing it to shift the gears 13 to their uppermost position, that is to say, ready for moving the carriage to the left. This position of the above stated elements is shown in Fig. 14. By the shifting of the gears 13 the direction of rotation of shaft 12 is shifted, so that it restores the carriage to the left. During the whole restoring stroke the reversing gearing 13/14 and the associated control means remain in the position shown in Fig. 14. In the meantime, the toggle joint lever 36 is held in its upper position and the toggle joint lever 33 in its lower position. Immediately before the carriage again reaches its extreme left hand position, the stud 39, which may pass freely above the upper end of lever 33, strikes the lever 36 and causes its spring 42 to shift the lever 36 to its lower position. Immediately following this operation stud 40 engages the toggle joint lever 33 and causes its spring to restore said lever to its upper position. This causes shifting of the pair of bevel gears 13 to their lower position to control a forward running of the carriage. Provided the current to the motor be not interrupted, the cariage will, therefore, reverse its movement and then again move to the right.

Let it now be assumed that a record is to be played. Then the carriage should stop when the record selected passes one or the other slot 9 according to the surface of the record which it is desired to play. If the piece to be played is on the right hand side of the record in question, as seen from the front of the apparatus, then the operator has to press the key of record in the lower group of keys (comprising the lower five rows of keys) of the keyboard. The key desired being depressed, the apparatus is started by closing the switch 85. The carriage now starts moving to the right in the way already described. As soon as the contact 55 belonging to the horizontal row in which the key depressed is situated, approaches this key, the gently sloping surface of the insulating cam 56 in which said contact 55 is embedded, will force the key outwards to a certain degree, before the contact engages the key. As soon as contact 55 engages the key depressed a current impulse is sent through coil 58, Fig. 9. The core 59 is now attracted and its supporting lever 60 acts by its tooth-shaped upper end on the bell crank lever 65 so as to allow its spring 69 to shift the toggle joint including the lever 65 to its upper position. The upper arm of lever 65 now engages arm 191 of the control shaft 46 and turns the latter in clockwise direction as seen from the front of the apparatus. At its fore end the control shaft 46 acts by means of its arm 48 on lever 25, Fig. 12, causing it to shift the pair of bevel gears 13 to its central position, Fig. 13, in which both gears are out of mesh with the driving gear 14, thereby stopping the shaft 12 and the carriage. At its rear end the control shaft 46, by means of arm 114, displaces the pair of bevel gears 113 to the right (Fig. 7), whereby the driven shaft 112 of chain 105 starts rotating in such a direction as to cause the portion of the chain carrying the brackets 106 to descend. Normally, the brackets are in their uppermost position in which they fill up the slot 9 of bar 7. Under the action of spring 103 that belongs to the toggle joint lever 97 they are positively held with their upper edge exactly on a level with the upper surface of bar 7. Thus, the records may pass the slots 9 without any trouble. As the carriage is stopped with a record selected standing right above the slot 9 in question, say the left hand one, the record selected is supported solely by the respective bracket. As soon as the carriage is stopped and the above said shifting of the gears 113 for lowering the brackets is effected the lowering of the bracket starts. The record selected accompanies the respective, that is, the left hand one, in its downward movement. In lowering, the record is guided by means of the guide levers 124 which are forced under the action of their springs 126 towards the edge of the record. While the carriage is moving said guide levers are removed from the path of the records by the stops 127, as already stated. The brackets continue moving downwards, until the stud 100 of the chain engages the fork-shaped upper arm of the bell crank lever 120 and operates same, so that the toggle joint lever composed of lever 120 and link 122 is shifted to its outer position allowing the associated spring 123 to force the brackets 106 down into their bottom position. As the engagement between the stud 100 and the lever 120 is brought about, the pin 118 engages the angularly shaped arm 114 of the control shaft 46 and causes a shifting of the pair of bevel gears 113 to their central position, thereby bringing both gears 113 out of mesh with the driving gear 213 with resulting stopping of the chain. Thereafter, spring 123 effects the final adjustment of the chain to positively move the brackets to their bottom position.

Once each revolution of the driving shaft 15 the supporting lever 60 of the attracted core 59 is positively retracted and immediately released, as will be hereinafter described. In order to prevent the core released to be again attracted by the coil 58, which would result in an oscillatory movement of the coil, it is necessary to open the circuit of the coil as soon as it has once attracted the coil and caused it to operate the lever 65, irrespective of the fact that the engagement between the contact 55 and the key depressed is maintained. This opening of the circuit of coil 58 is effected at the contacts 74, 75. As the toggle joint lever 65 is shifted to its upper position in the way above described, the arm 70 carried at the end of the link 68 belonging to said toggle joint lever engages the multiarmed lever 71, moving it from its normal position in which the contacts 74, 75 are closed, to the position shown in Fig. 8, thereby opening said contacts. At the same time the opposite, hook-shaped arm of lever 71 projects into the path of the pins 77 on the under surface of the lower gear 13. As soon as gear 13 again starts rotating to continue the movement of the carriage to the right, the lever 71 is swung back to position for closing the contacts 74, 75. As already described, the pins 77 may only reach the lever 71 in the lowermost position of the gears 13 which corresponds to forward running of the carriage (to the right). The circuit of coil 58 is now restored to its normal state. In the uppermost position of the pair of gears 13, that is to say, during the return stroke of the carriage (from the right to the left), the pins 77 pass freely above the lever 71. In the meantime the contacts 74, 75, therefore, remain in closed state. The circuit, however, must also be opened during the return stroke in order to prevent current impulses from being sent through coil 58 under the control of keys which may have been depressed by a mistake after the respective contact piece 55 has passed by them. This operation is attended to by the insulating knife 83 carried by the lever 25, which during the return stroke of the carriage opens the circuit of coil 58 by entering into between the normally closed contact plates 81 likewise inserted in the circuit of coil 58.

But it is not only the circuit of coil 58 but also the toggle joint lever 65 as shifted due to the energizing of said coil that should be restored to normal position immediately following its function to turn the control shaft 46 in order to be ready for another operation. Said restoring operation is effected by means of the pawl 79 rotating with shaft 15. As the upper arm of lever 65 was swung upwards, the hook-shaped end of the lower arm of said lever entered the path of pawl 79. The pawl will, therefore, be caught by said hook-shaped end and caused to turn on its pivot 80 against the action of its spring while raising the depending arm of lever 65 sufficiently to allow spring 69 to remove lever 65 to its normal position. It is thus seen, that while the carriage has been stationary and the key depressed remains engaged by the respective contact 55, the electric control mechanism is restored to normal position.

As the above described lowering of the brackets and the record carried by one bracket started, the stud 100 of the chain acted on the bell crank lever 97 to initiate its shifting to its outer position, as shown in Fig. 4. By means of link 94 the lever 97 brought the detent 90 into engagement with rack 10 so as to lock the carriage exactly in its set position, as long as the brackets remain out of their normal or uppermost position.

After the brackets have reached their lowermost position, the position of the reversing gearing 13, 14 is that shown in Fig. 16.

Let it be assumed that the selected record lowered by the left hand bracket is of the small size. The control shaft 144' of the left hand playing device should then be in such a position that its arm 149 and roller 148 are in register with cam 150, as shown in Fig. 5. Near the end of the downward motion of the brackets said cam 150 by its engagement with the roller 148 starts turning the arm 149 and thus the shaft 144'. The shape of cam 150 is so designed as to cause the shaft 144' through the intermedium of the lever 146 to let the shaft 136 of the pressure disc engage the central aperture of the record by its pointed end at the very same moment at which said aperture passes by the center of the turn-table 130. The record is now caught by the pressure shaft and forced by the pressure disc against the turn-table with the axis thereof coinciding with that of the turn-table.

If, on the contrary, the record selected were of the larger size, then the shaft 144' would have been set to such a position as to have its roller 148 in register with cam 151. In this case the pressure disc shaft 136 would have caught the larger record at the very moment at which its central aperture passed the axis of the turn-table. The cams 150 and 151 are so shaped as to let the feeding of the pressure disc shaft take place quickly in order to prevent the pressure disc shaft from touching the record adjacent its aperture or enlarging the aperture by breaking its edge.

The record having been positioned on the turn-table in the way described, the sound box and the needle carried thereby should be fed towards the record. The motion is also controlled by the shaft 144'. The turning of shaft 144' under the control of cam 150 or 151 amounts in the example described to 90° and permits a slow motion of the sound box and needle towards the record. The movement is enlarged in an appropriate degree by the action of the bar 177.

In normal position, the bar 177 is situated in a horizontal plane, as shown in Fig. 3 having its free edge projecting directed away from the turn-table, so as to keep the sound box and its projection 175 at a distance therefrom. The tone is normally swung as far as possible from the axis of the turn-table. The upstanding arm of the projection 175 and the spring 176 are by this time in engagement with the recess 178 at the outer end of bar 177, the spring being held under tension by pressing it against the arm of projection 175. While shaft 144' is turned 90° by the action of cam 150 (or 151), the bar 177 is changed from its horizontal outwardly pointing position to a vertical upwardly pointing position. In the meantime the tone arm with the sound box and the needle gradually approaches the record.

While the shaft 144' is turning, the upstanding arm of projection 175 and the spring 176 remain in the recess 178, until the needle engages the record. On the continued turning of shaft 144' the tone-arm cannot, therefore, come near to the record. Instead thereof, the projection and spring 176 are gradually lifted out of engagement with the recess 178. In the vertical final position of bar 177 the tensioned spring 176 only engages the upstanding end of the bar which forms the outer wall of the recess therein, see Fig. 4. For the rest, the tone-arm is fully released from shaft 144' and its bar 177 and may be moved along the shaft towards the axis of the turn-table without interfering with shaft 144' or bar 177. Spring 176 is now allowed to turn the tone-arm sufficiently in this direction to bring the needle into engagement with the outermost winding of the spiral sound groove of the record. Prior to this operation the tone-arm is released from the action of its spring-loaded restoring lever 179', 179''. This is effected by the brackets which under the last portion of their downward movement engage arms 179'' of both restoring levers and turn same against the action of their springs 180. As soon as the engagement of the needle into the record is brought about, the playing of the record starts.

When the playing of the record is ended the mercury switch 174 as carried by the sound box effects closing of the circuit of coil 181, so that it attracts its coil 182. This causes the coil supporting lever 183 to act by its tooth-shaped upper end on the depending arm of the bell crank lever 185 and turns same to its upper position where it is held by its spring 189. When thus shifting position the lever 185 operates arm 192 of the control shaft 46, turning the latter to the position shown in Fig. 17. In this position the pawl 49 of arm 47 engages the tooth 52 of lever 24, whereas the arm 48 is removed from lever 25. At the rear end of the control shaft the arm 114 shifts the gears 113 to the left from their middle position shown in Fig. 7 so as to bring the left hand gear 113 into mesh with the driving gear 213 to rotate the driven shaft 112 of chain 105 in a direction to restore the brackets to their upper position. Just as the brackets are about to reach their upper position the stud 119 of the chain operates the arm 114 and shifts the gears 113 to their middle position, bringing the chain to stop.

As the stud 100 of the chain during the upward movement engages the bell crank lever 97, a shifting of the latter to its other position is initiated which is completed by the spring 103. The chain is hereby adjusted to the position in which the brackets fill up the slots 9 so that their upper edges are on a level with the upper surface of the bar 7. As a result, the record is now again in its place in the carriage. At the same time the bell crank lever 97 by means of the link 94 has removed the detent 90 from its engagement in the rack 10, thereby releasing the carriage so that it may continue its movement.

By the action of the stud 119 on the arm 114, as above described, the control shaft 46 is rotated to shift its pair of arms 47, 48 from the position shown in Fig. 17 to the position shown in Fig. 12, that is to say, arm 47 is raised and arm 48 lowered to middle position.

While moving upwards arm 47 raises the lever 24 due to the engagement between its pawl 49 and the tooth 52 of the lever. The lever 24 is thereby caused to shift the gears 13 to their lower position so as to throw the upper gear into mesh with the driving gear 14. As a result, the vertical shaft 12 starts rotation in a direction to move the carriage in the forward direction, that is to say, to the right.

On the continued movement of the carriage to the right, the key depressed will be positively restored to its normal position by sliding onto the apex of the respective cam 56. The movement of the carriage to the right will continue either until a contact 55 of any row engages a key depressed, in which case the cycle described will be repeated in respect of another record, or until the carriage reaches its extreme right hand position and reverses its direction of movement in the way already described. During the return stroke of the carriage the steep left hand surfaces of the cams 56 restore those keys which might have been depressed by a mistake.

Hereinbefore it has been assumed that a record of the small size has been played. In such case the control shafts 144', 144'' of the playing mechanisms are in the positions shown in Fig. 5, that is to say, with their rollers 148 in register with the cams 150. Shifting of the shafts 144', 144'' in order to bring their rollers 148 into register with the cams 151 is effected automatically under the control of the carriage. As during the movement of the carriage from the left to the right the last small record of the group of small records contained in the carriage has passed by the left hand slot 9, the rigid cam 152 provided on the carriage engages pin 158 of the toggle joint 154, 157 controlling the axial displacement of shaft 144' and shifts said toggle joint to its opposite position, as indicated by dotted lines in Fig. 5, in which position the arm 149 of shaft 144' and the associated roller 148 are in register with cam 151. When, thereafter, the last small record of the group has passed the right hand slot 9, the cam 152 engages the pin 208 on the toggle joint lever 162 and shifts the toggle joint 162/165 to its opposite position, as indicated by dotted lines, in which position the arm 149 of shaft 144'' and the associated roller 148 are in register with cam 151.

While the carriage is returning to its normal, or extreme left hand, position the gently sloping cam 152' engages the two pins 166 and 158, respectively, of the toggle joints 162/165 and 154/157 and causes them to restore to their normal positions, shown by full lines in Fig. 5, thereby pulling the shafts 144' and 144'' back again to position for controlling the playing of small-sized records, that is, with the rollers 148 in register with cams 150.

If it is desired to play the same record more times the switch 87 should be operated. This will close a circuit through the coil 58 at conductor 194 and contact plate 195. The playing of the record being ended, the record will be raised by the respective bracket; when the brackets reach their uppermost position, however, the projection 196 enters into between said conductor and said contact plate, so as to close a circuit through the coil 58. Due thereto, a shifting of the gears 113 to position for lowering the brackets will take place in the way already described, the brackets when thus moving downwards again lowering the record to playing position. This operation will be repeated until the circuit controlled by the switch 87 is opened.

In case there have been too many keys depressed and it is desired immediately to interrupt the playing, the switch 86 is to be operated. This will allow the carriage to run directly to its extreme right hand position without stopping at any key depressed, then reverse its movement and return to its normal position in usual order.

If it is desired to interrupt the playing during the playing of a record, the switch 87 should be operated. This will send an impulse of current through coil 181 causing it to act in the same way as though an impulse were sent through the coil by means of the mercury switch 174.

In the embodiment above described two independent, though commonly driven, turn-tables are provided, having their record supporting surfaces remote from each other. Said surfaces, however, may also be formed by the sides of the turntables facing each other.

As a further modification, the two record supporting surfaces may be provided on a single turn-table. An embodiment of such a turn-table is shown in Figs. 18 and 19, and another one is shown in Figs. 20 and 21.

In Figs. 18 and 19 the numeral 300 designates a turn-table having two record supporting surfaces. The turn-table is composed of two frusti-cones connected at their tops by means of a cylindrical portion so as to present an annular groove around its periphery. The turn-table is mounted on a pair of frusti-conical supporting rollers 301 and is guided by two similar pairs of rollers 302. The shaft 303 of the supporting rollers 301 is mounted in bracket 304 fastened to the rear column 3 of the framework of the machine. The shafts 305 of the guide rollers 302 are mounted in brackets 306 depending from bar 7. The turn-table 300 may be rotated in both directions by means of a reversible motor 307, a clutch 308, a shaft 309 and a pair of friction rollers 310 on said shaft. Shaft 309 is mounted in bearings 311 and 312. The direction of rotation of the turn-table depends on the record supporting surface to be used.

As already described in connection with the description of Figs. 1–17, the upper half-part of the keyboard 53 and the upper half-part of the panel 52 are designed to control the playing on one record-supporting surface and the lower half-part of the keyboard and the lower half-part of the panel are designed to control the playing on the other record-supporting surface. The both half-parts of the panel are insulated from each other so that as soon as circuit is closed at a key in the upper half of the keyboard through the coil 58 for moving a record from the magazine to the respective record supporting surface, current also passes through a coil 313 causing it to attract its armature 314 which operates a switch 315 controlling the direction of rotation of motor 307. In a similar way the coil 316 is energized in a circuit closed by a key in the lower half-part of the keyboard. When energized coil 316 attracts its armature 317 which causes the switch 315 to again reverse the motor 307.

As the motor 307 is reversible this system requires an additional motor 318 for effecting, via shaft 319 and worm gear 320, 321, the rotation of shaft 15, which controls in the way already described the running of the magazine and the moving of the records from the magazine to the playing mechanism and back again to the magazine. In this embodiment the arm 71 controls, by contact members 322, 323, two breaks 324 and 325 in the circuits controlled by the upper and lower half-parts of the panel keyboard, as will appear from Fig. 23. This figure is a diagram of the electric circuits of this embodiment and is considered self-explaining.

In the modified form shown in Figs. 20 and 21 two turn-tables 450 and 451 are used which are situated like those of the embodiment shown in Figs. 1–17 except that they are rigidly connected to each other through a common shaft 452 mounted in a bearing 453 carried by a bracket 454 fastened to column 3. The adjacent surfaces of the turn-tables are formed as conical friction surfaces 1 adapted to be alternately engaged by a friction gear 455 mounted at the upper end of an upstanding shaft 456, the lower end of which is hingedly mounted on the upper end of the vertical shaft 458 of motor 459 by means of a ball 457 engaging cup-shaped recesses formed in the lower and upper ends of shafts 456 and 458, respectively. Surrounding the shaft ends is a bushing 460 of an elastic material, as rubber, which acts as a clutch causing shaft 456 to rotate with shaft 458 while allowing it to rock with relation thereto in order to shift the friction gear 455 from one turn-table to the other. Immediately below the friction gear 455 the rocking shaft 456 engages a transverse guideway form in an arm 461 of bracket 454 so that shaft 456 can only rock in the vertical plane parallel extending through the axis of the turn-tables.

The rocking of shaft 456 and consequent shifting of gear 455 is effected under the control of two induction coils 462 and 463, the armatures 464 and 465, respectively, of which are connected together by means of a rod 466. An inner point of said rod is pivotally connected, at 467, to the toggle joint lever, comprising an upper member 468 pivoted to the bracket 454 at 469 and carrying at its upper end a movable bearing 470 for shaft 456, and a lower member 471 pivoted to the power shaft 458. Said member 471 carries a spring 472 adapted to keep the toggle joint lever in shifted position.

The circuit of induction coils 462 is controlled by the upper group of keys of the keyboard, and the circuit of induction coils 463 is controlled by the lower group of keys of the keyboard. When energized after depression of a key in the upper group, induction coils 462 attracts its armature 464 and causes the toggle joint lever to move gear 455 into engagement with turn-table 450, as shown. The induction coils 463, when energized, shifts the toggle joint lever to the left, thereby moving gear 455 into engagement with turn-table 451.

In this case there is no need for a second motor. The motor 459 operates, via worm gear 480, 481, shaft and reversible gearing 13, 14, the vertical shaft 12 for driving the magazine. The electrical circuits of this embodiment are shown in Fig. 24. The elements 322—325 are equivalent to those shown in Figs. 19 and 23.

Amongst other modifications it is to be noted that the apparatus may be constructed for handling but one size of records. The carriage need not run on a horizontal path, nor need it be placed above the playing mechanism. While maintaining the main parts of the apparatus and their relative positions essentially unchanged, another direction of movement of the carriage may be used and another position of the turn-tables, as for instance, a vertical direction of movement of the carriage and a horizontal position of the turn-tables.

What we claim is:

1. An automatic phonograph comprising in combination a frame work, a rectilinear lined guideway thereon, a magazine for receiving records of different sizes, wheels on said magazine to support it on said guideway, a driving mechanism including a motor and transmission elements for reciprocating the magazine on the guideway, contact elements on the framework and contact elements on the magazine for cooperation with the contact elements of the framework during the movement of the magazine, a circuit under the control of said contact elements having means for selectively stopping the magazine during its movement with any desired record therein situated in register with any of two record delivery points provided in spaced relation to each other along the guideway, conveying means operable by said circuit for receiving a record at any of said delivery points and withdrawing it from the magazine, a playing mechanism provided in the framework, said mechanism having a rotatable record supporting element and a tone arm corresponding to each record delivery point, means under the control of said record conveyer for moving a record withdrawn from the magazine into engagement with the respective record supporting element, means under the control of said record conveyer for moving the respective tone arm into engagement with the first winding of the sound groove of the record, switching means operable by the tone arm at the end of its playing stroke and circuit means controlled thereby for effecting the return stroke of the conveyer, means operable by the returning conveyer for releasing the record from the rotatable supporting element and allowing it to be caught by the returning conveyer, means operable by the conveyer for restoring the tone arm to its initial position, and means operable by the conveyer at the end of its return stroke for switching in the driving elements of the magazine to cause the magazine to continue its movement on the restoration of the record thereinto.

2. An automatic phonograph as claimed in claim 1 characterized by the further feature that the playing mechanism includes two separate turn-tables having a common axis, and having their record supporting surfaces on their sides remote from each other and which are rotatable in opposite directions.

3. An automatic phonograph as claimed in claim 1, characterized by the further feature that the playing mechanism includes two separate turn-tables having a common axis, and having their record supporting surfaces on their sides facing each other and rotatable in opposite directions.

4. An automatic phonograph as claimed in claim 1, characterized by the provision in the framework of a smooth member extending in the direction of movement of the reciprocable magazine for supporting the records contained in the magazine, said member being formed with slots at two spaced points to allow a record selected to be discharged from the magazine through either of said slots, the distance between said slots corresponding to a whole number of record spaces in the magazine and a fraction of such a space in order that only one record at a time may be discharged from the magazine.

5. An automatic phonograph as claimed in claim 1, characterized by the further feature that the record containing magazine is open-topped and open-bottomed, a smooth bar being provided in the framework below the magazine which extends in the direction of movement of the magazine for supporting the records contained in the magazine, slots being provided at two points of said bar to allow discharge of the records from the magazine.

6. An automatic phonograph as claimed in claim 1, and in which the magazine is open-bottomed and a bar is provided in the framework below the magazine to support the records contained therein, said bar having slots at two points for discharging a record at a time from the magazine, each slot leading to an individual one of the record supporting surfaces of the playing mechanism, characterized by the fact that the means for removing a selected record from the magazine through a slot comprises two rigidly connected brackets each adapted to carry a record as discharged through an individual one of said slots, said brackets being so shaped as to fill up the slots formed in said bar when in their upper position.

7. An automatic phonograph as claimed in claim 1, and in which the playing mechanism includes a second rotatable record supporting element having an associated tone arm provided with a sound box and an associated needle, the tone arm also having a sound box provided with an associated needle, the means for moving the respective tone arms comprising guide rods, a pressure operated disc to center a record selected with relation to said surface and to maintain it thereagainst while playing is taking place, a spring acting on said tone arm to move it towards the axis of the rotatable record supporting surface, said guide rod having an incision engaged by the sound box in the normal position of the playing mechanism, the arrangement being such as to release the sound box from its engagement in said incision when the needle during its movement towards the record supporting surface comes into contact with the record, thereby stopping the movement of the tone arm towards the supporting surface, said spring being also adapted to move the tone arm in the direction towards the axis of the record supporting surface in order to bring the needle into engagement with the starting end of the spiral groove of the record.

8. An automatic phonograph as claimed in claim 1, and in which the magazine is provided with open-bottomed compartments for receiving the records, a stationary support being provided below the carriage to support the records contained therein, said support having slots formed in it to allow discharge of the records selected for their movement to playing position, characterized by the fact that the record supporting elements of the playing mechanism are so related to the slots in said supports as to allow a record while discharged from the carriage to slide along the respective record supporting surface until reaching a central position thereon.

9. An automatic phonograph as claimed in claim 1, characterized by the fact that the playing mechanism is provided with a single turntable having record supporting surfaces on both of its sides.

10. An automatic phonograph as claimed in claim 1, and in which the magazine has a separate compartment for each record, characterized by the fact that all compartments are dimensioned to receive a record of a large size, the magazine being provided with means for adjusting the compartments to suit records of a smaller size.

11. An automatic phonograph as claimed in claim 1, and in which the playing mechanism includes, for each rotatable record supporting element a hinged tone arm having a sound box and associated needle seat, characterized by the provision of means to simultaneously move said tone arms towards or away from their respective record supporting surfaces.

12. An automatic phonograph as claimed in claim 1, characterized by the provision, for each record supporting surface of a pressure operated disc to center a selected record with relation to the respective surface and to exert a pressure thereon in order to maintain the record in said centered position.

13. An automatic phonograph as claimed in claim 1, and in which two circuits are provided for selectively stopping the magazine with a desired record at any of the delivery points, the circuits each being for one of the respective delivery points, each of said circuits including a separate group of rigid contact elements on the movable magazine and a corresponding group of key operable contact elements on the framework.

14. An automatic phonograph as claimed in claim 1, characterized by the fact that the playing mechanism includes a single turn-table, having a record supporting surface on each side and a friction roller drive for said turn-table including a separate motor and a reversing mechanism for said motor.

15. An automatic phonograph as claimed in claim 1, characterized by the fact that the playing mechanism includes two spaced turn-tables rigidly connected together, each turn-table having a friction surface, a friction gear shiftable to two operating positions for alternately engaging one and the other of said friction surfaces, and means for effecting said shifting of the friction gear.

16. An automatic phonograph as claimed in claim 1, and in which the magazine has a separate compartment for each record, characterized by the provision of means outside the magazine for selectively adjusting the relation between the compartments for receiving records of different sizes.

17. An automatic phonograph as claimed in claim 1, and in which the record magazine is provided with a compartment for each record as well as with means for selectively suiting said compartment to records of a large or small size, characterized by the provision of automatic means for accordingly adjusting the playing mechanisms for playing different sizes of records.

18. An automatic phonograph as claimed in claim 1, characterized by the fact that the contact elements of the framework and of the magazine for controlling the circuit to effect stopping of the magazine comprise two groups of contact elements provided on the magazine and two groups of key-operable contact elements provided on the framework, one group being for each side of the records, the two groups of contact elements of the magazine being situated on different levels and being displaced with relation to each other in the direction of movement of the magazine by an amount corresponding to the distance between the record delivery points, the contact elements of each such group being arranged in staggered relation to each other with the spacing between adjacent contact elements in the direction of movement of the magazine corresponding to the spacing between the compartments of the magazine, the contact elements and associated keys provided on the framework comprising a horizontal row for each contact of the magazine, the distance between adjacent keys of each such row being equal to the spacing of the compartments of the magazine by the number of contact elements of each group of the magazine.

ERIK ARNE LANDBERG.
NILS GUSTAV YNGVE TORPHAMMAR.

REFERENCES CITED

The following references are of record in the file of this patent:

UNITED STATES PATENTS

| Number | Name | Date |
| --- | --- | --- |
| 1,590,654 | Smith | June 29, 1926 |
| 1,869,770 | Oyston | Aug. 2, 1932 |
| 2,281,548 | Andrews | May 5, 1942 |
| 2,318,654 | Wissner | May 11, 1943 |

FOREIGN PATENTS

| Number | Country | Date |
| --- | --- | --- |
| 525,776 | Germany | May 28, 1931 |
| 533,976 | Germany | Oct. 14, 1932 |